US007003397B2

(12) United States Patent
Yokota et al.

(10) Patent No.: US 7,003,397 B2
(45) Date of Patent: Feb. 21, 2006

(54) OFF-ROAD TRAIL RECORDING METHOD AND APPARATUS FOR NAVIGATION SYSTEM

(75) Inventors: Tatsuo Yokota, Torrance, CA (US); Andrew S. de Silva, Torrance, CA (US)

(73) Assignee: Alpine Electronics, Inc, Tokyo (JP)

( * ) Notice: Subject to any disclaimer, the term of this patent is extended or adjusted under 35 U.S.C. 154(b) by 182 days.

(21) Appl. No.: 10/641,229

(22) Filed: Aug. 14, 2003

(65) Prior Publication Data

US 2005/0038595 A1   Feb. 17, 2005

(51) Int. Cl.
  *G01C 21/26* (2006.01)
(52) U.S. Cl. .................... 701/200; 701/23; 701/26; 701/211; 340/990; 340/995.18; 340/995.21
(58) Field of Classification Search ............ 701/23–26, 701/200–202, 207–211; 340/988, 990, 995.1, 340/995.18, 995.19, 995.2, 995.21
See application file for complete search history.

(56) References Cited

U.S. PATENT DOCUMENTS

| | | | | |
|---|---|---|---|---|
| 5,243,528 A | * | 9/1993 | Lefebvre ................... 701/211 |
| 5,303,159 A | * | 4/1994 | Tamai et al. ................ 701/210 |
| 5,508,931 A | * | 4/1996 | Snider ........................ 701/207 |
| 5,659,476 A | * | 8/1997 | LeFebvre et al. ............ 701/201 |
| 5,911,775 A | | 6/1999 | Tanimoto .................... 701/210 |
| 6,356,837 B1 | | 3/2002 | Yokota et al. .............. 710/208 |
| 6,385,538 B1 | * | 5/2002 | Yokota ........................ 701/211 |
| 6,453,235 B1 | * | 9/2002 | Endo et al. ................. 701/211 |
| 6,751,550 B1 | * | 6/2004 | Niitsuma .................... 701/210 |
| 2004/0220730 A1 | * | 11/2004 | Chen et al. ................. 701/210 |

* cited by examiner

*Primary Examiner*—Gertrude A. Jeanglaude
(74) *Attorney, Agent, or Firm*—Muramatsu & Associates

(57) ABSTRACT

An off-road trail recording method and apparatus for use with a navigation system for recording an off-road trail when a vehicle travels in an off-road area to safely return to the original road. The off-road trail recording is achieved without regard to on/off settings of the off-road trail recording function by the user. The navigation system automatically detects that the vehicle has left the road and starts recording the off-road trail in a background mode without display the off-road trail. When the user turns on the off-road trail recording function later, the navigation system prompts the user to decide whether the off-road trail recorded in the background should be recovered in a normal mode. The navigation system provides various means for recording the off-road trail with reduced resolution when the memory capacity is exhausted or insufficient.

28 Claims, 21 Drawing Sheets

Fig. 1A

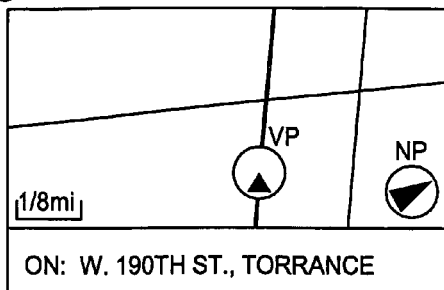

ON: W. 190TH ST., TORRANCE

Fig. 1B

MENU

| Destination |
| Set Up |
| Option |
| Route |

Fig. 1C

| Dest | Find Destination by |

| Address |
| Intersection |
| Point of Interest |
| Map Cursor |
| Recent Route |
| Address Book |
| Today's Plan |

Fig. 1D

| Dest | Input Street Name |

DEL

| A B C D E F G H I J | Delete |
| K L M N O P Q R S T | |
| U V W X Y Z & ' / - | Space |
| 1 2 3 4 5 6 7 8 9 0 | |

DEL AMO
DEL TACO
DOKOMO

Fig. 1E

CONFIRM ROUTE

DEL AMO
3525 W. Carson St.
Torrance, CA
(310) 456-7890

| By Quickest Route Method |
| OK to Proceed |
| Options |
| Verify Trip Itinerary |

Fig. 1F

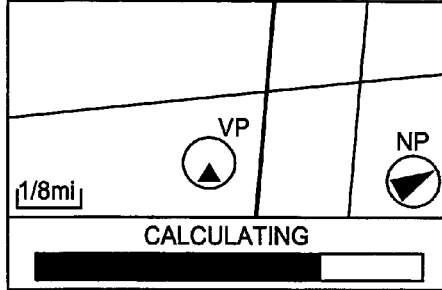

CALCULATING

Fig. 1G

NEXT TURN: ← 0.8 MI
PRAIRIE AVE.

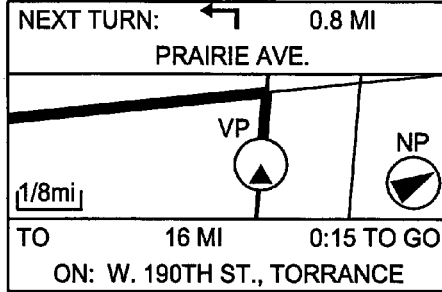

TO    16 MI    0:15 TO GO
ON: W. 190TH ST., TORRANCE

Fig. 1H

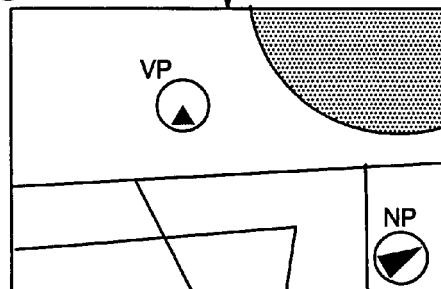

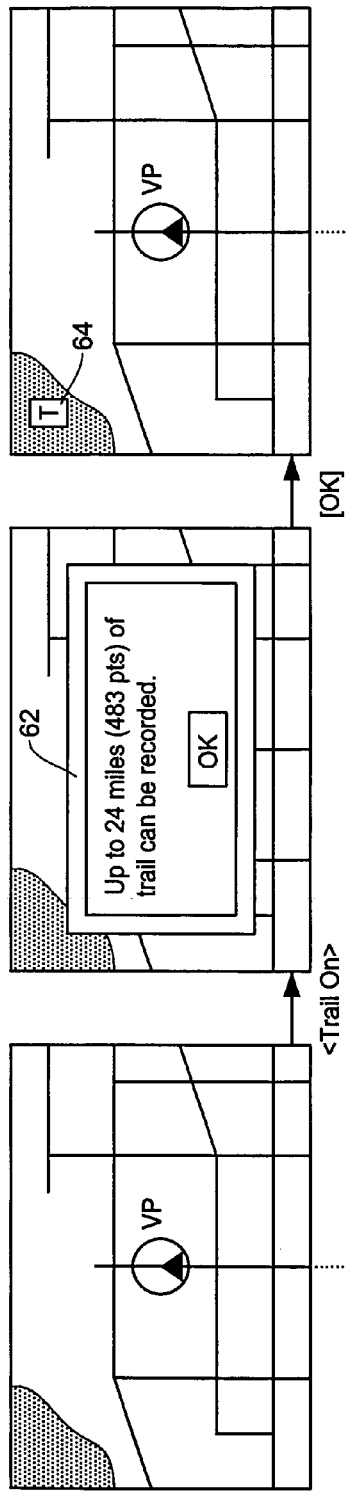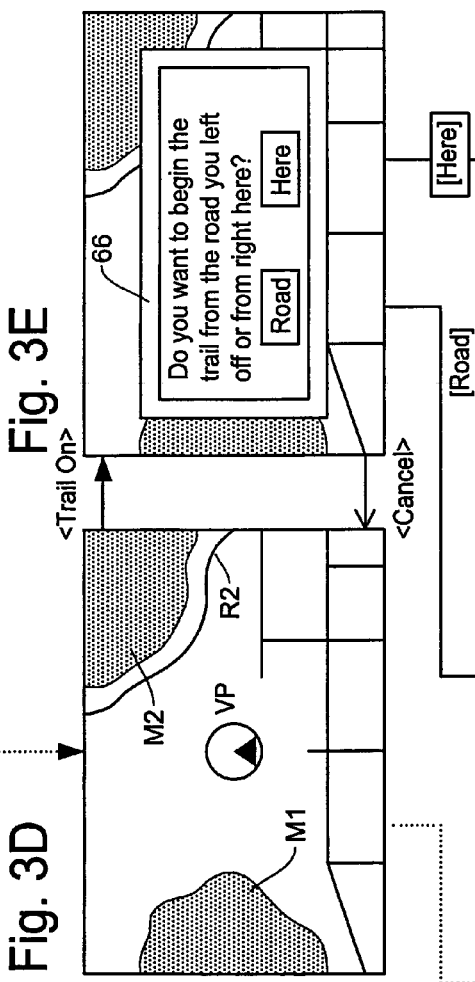

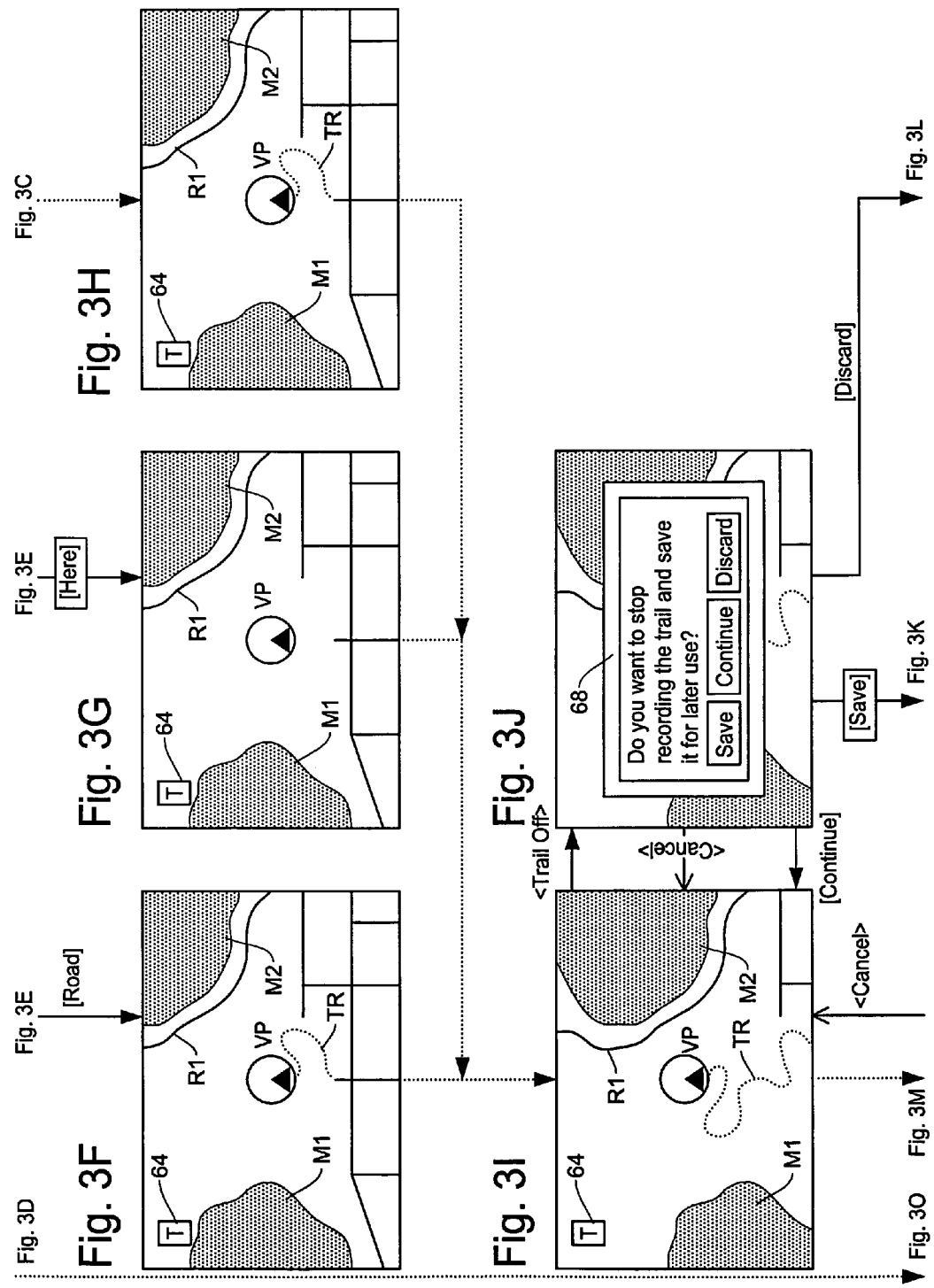

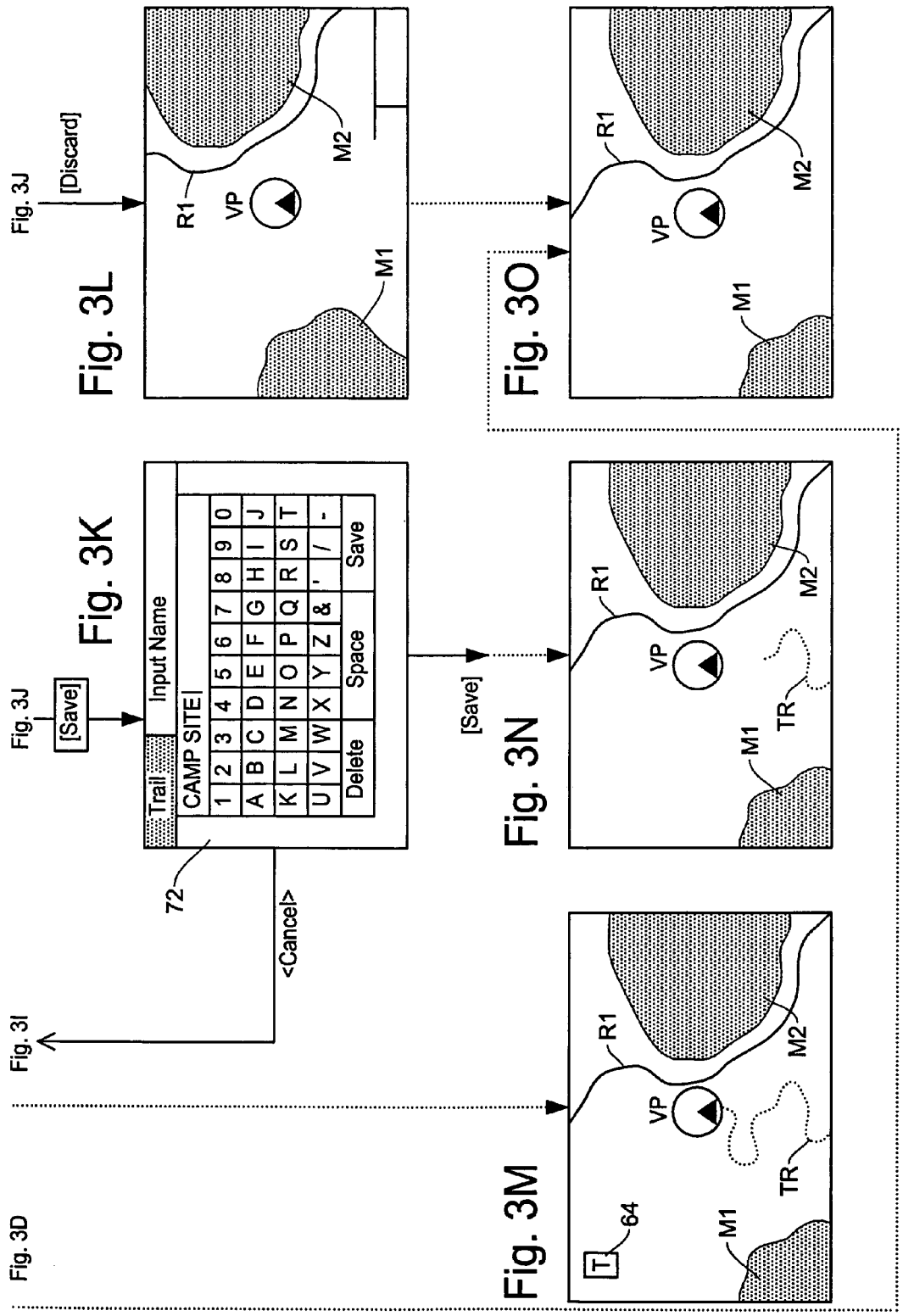

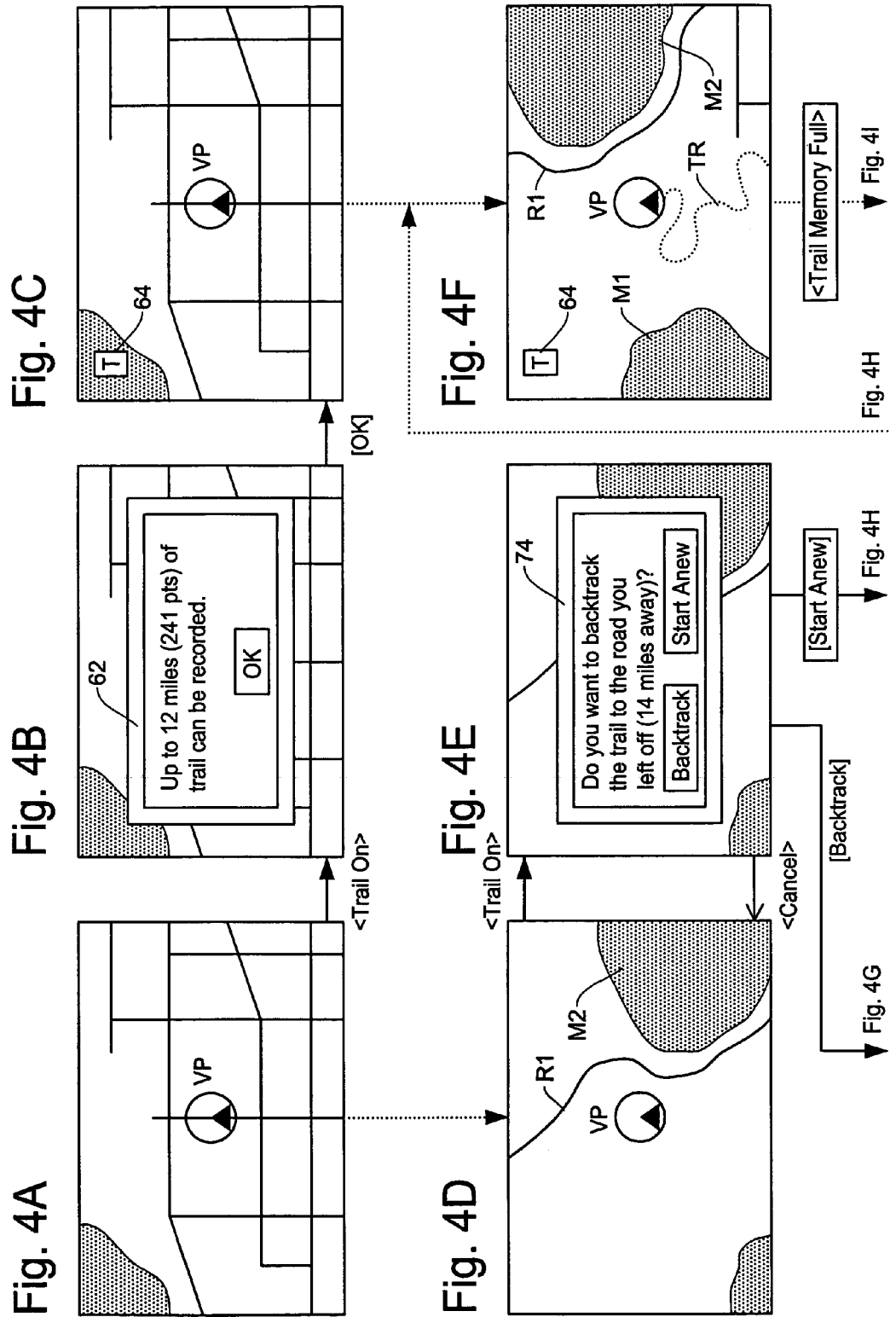

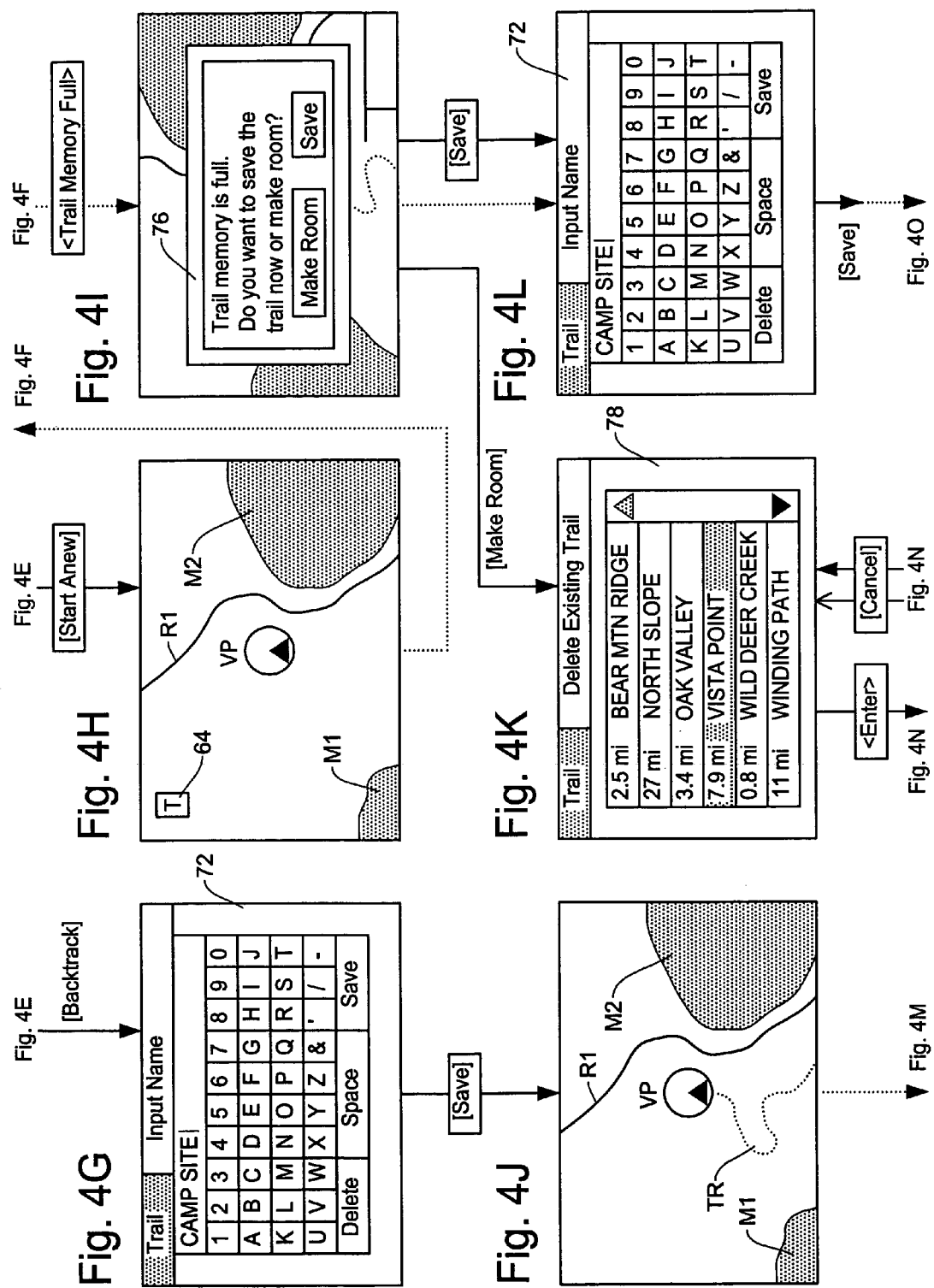

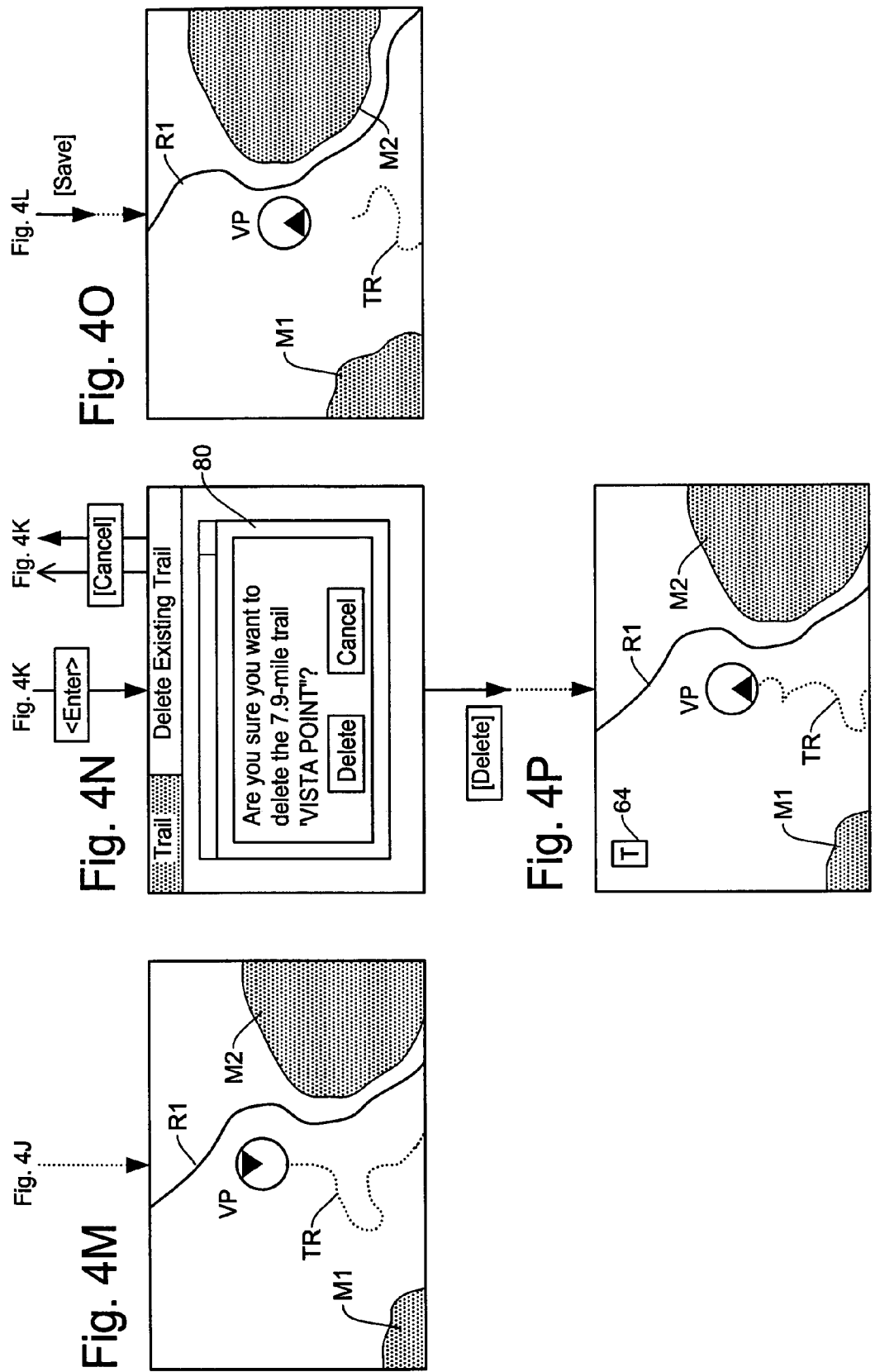

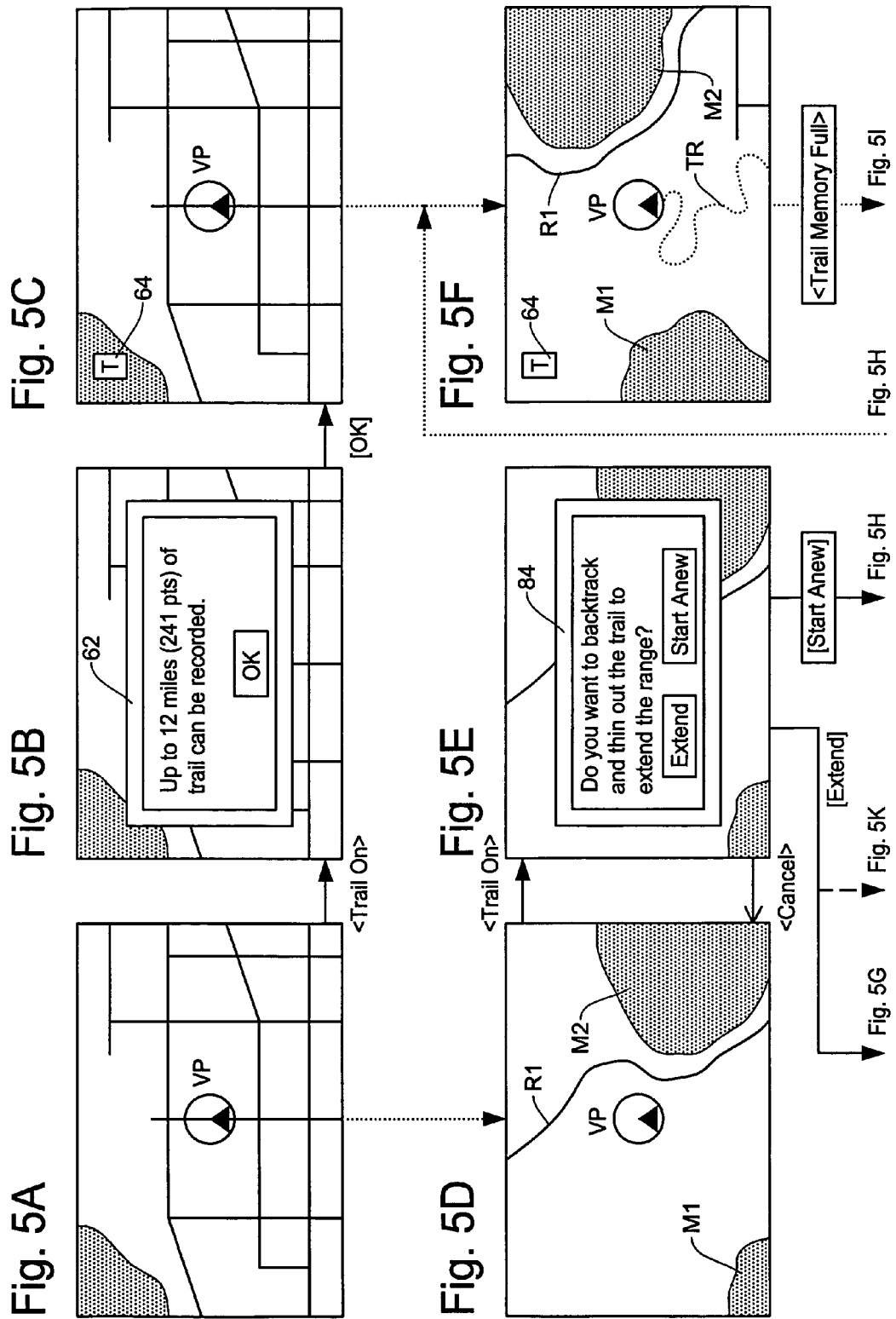

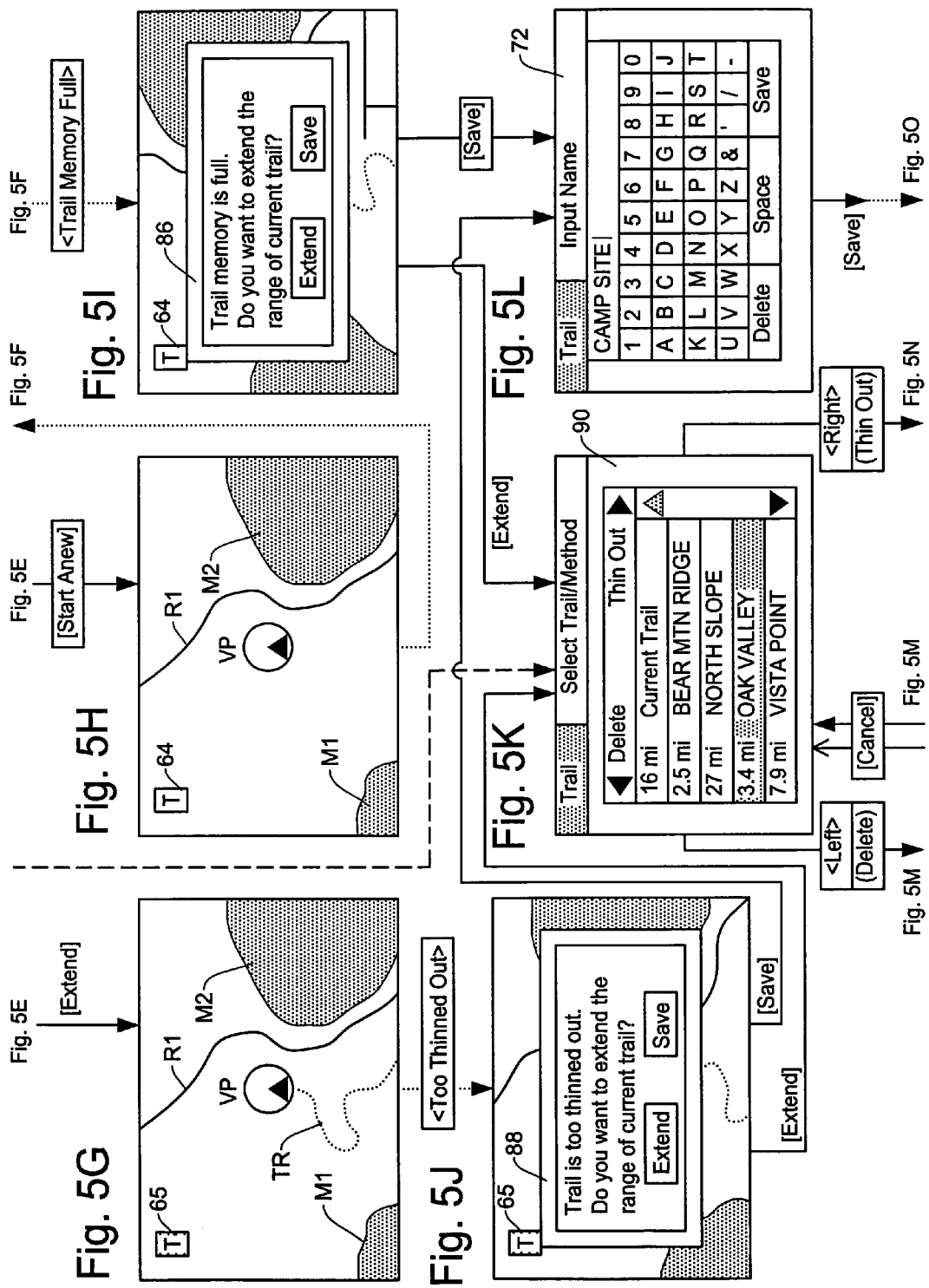

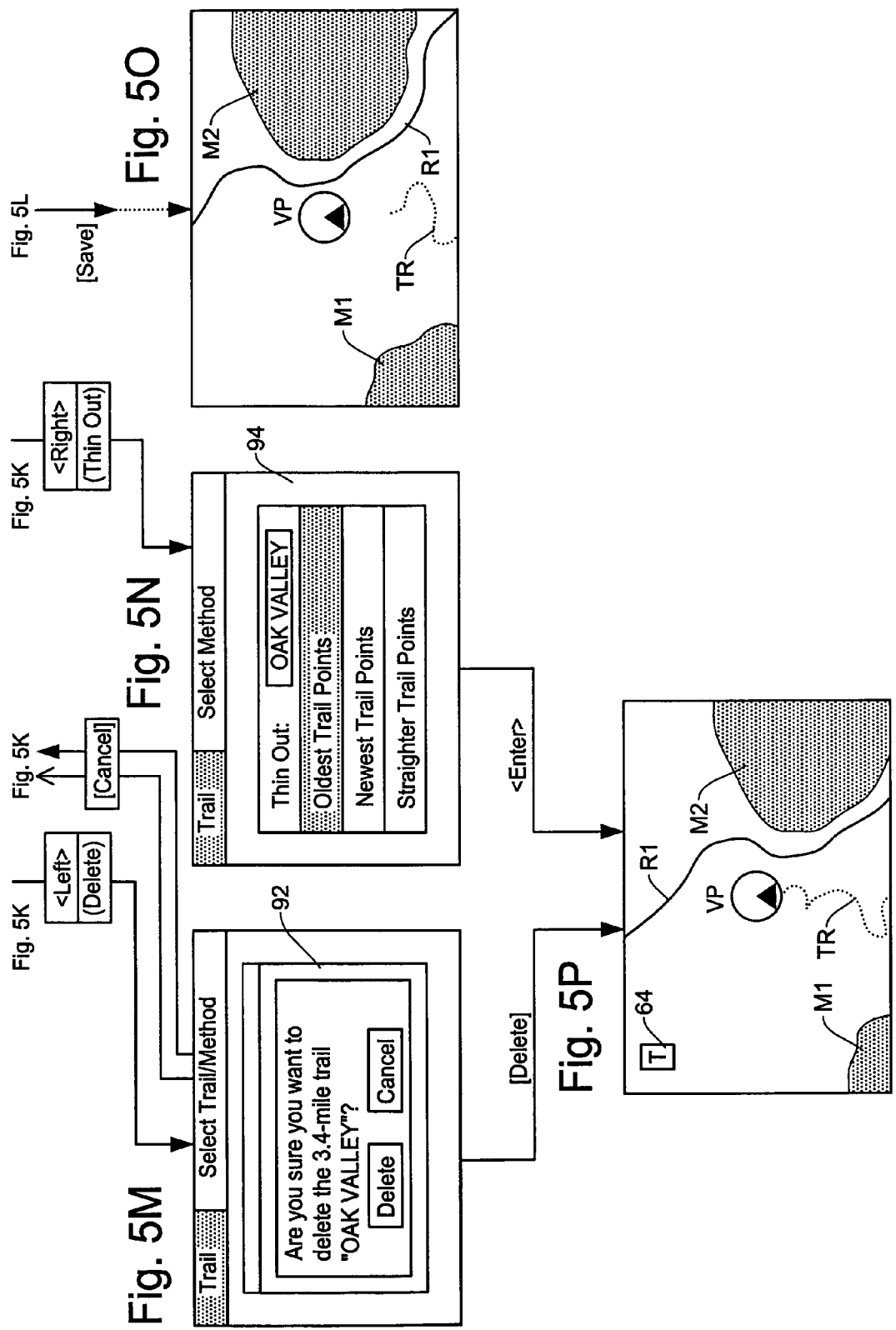

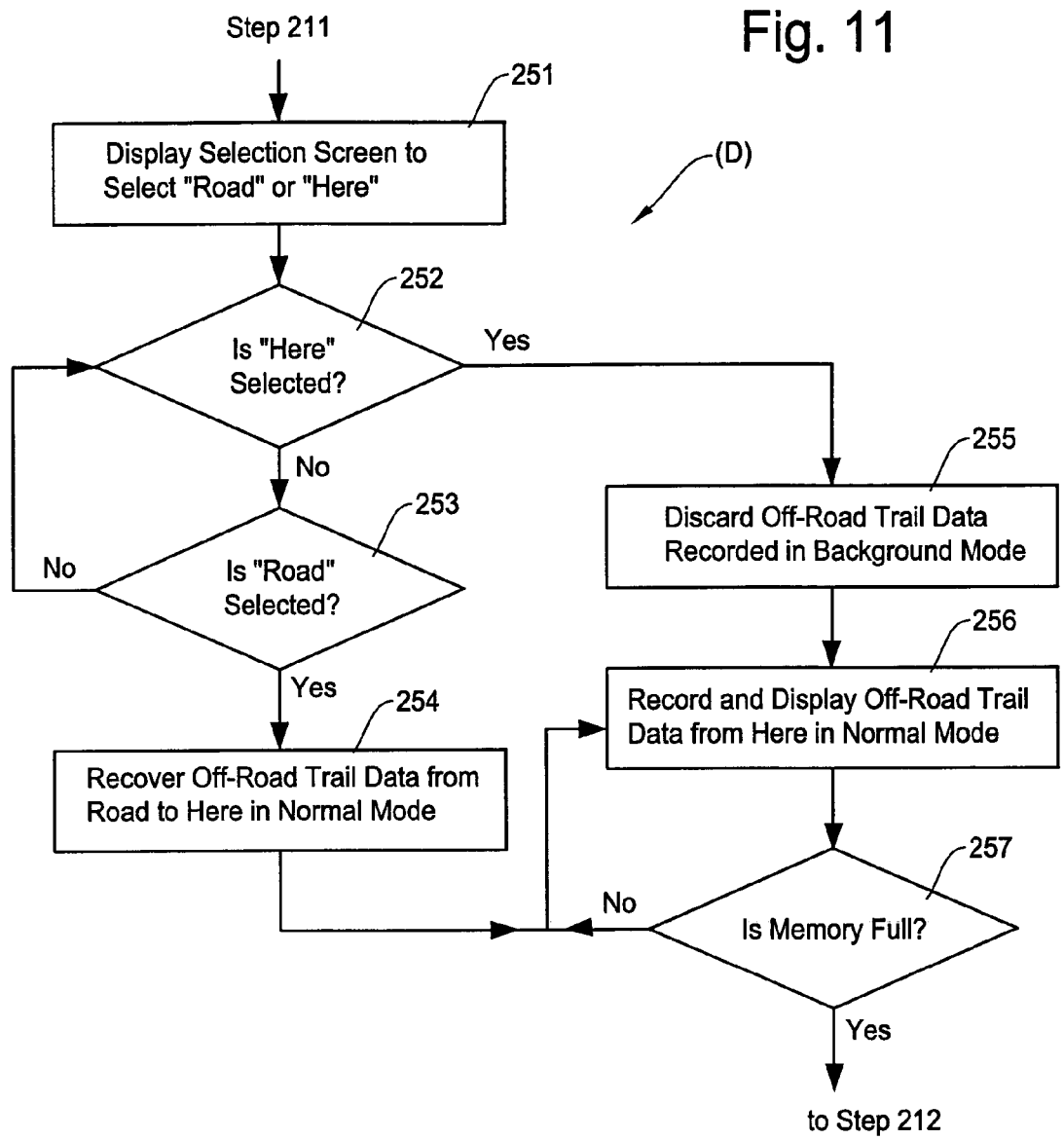

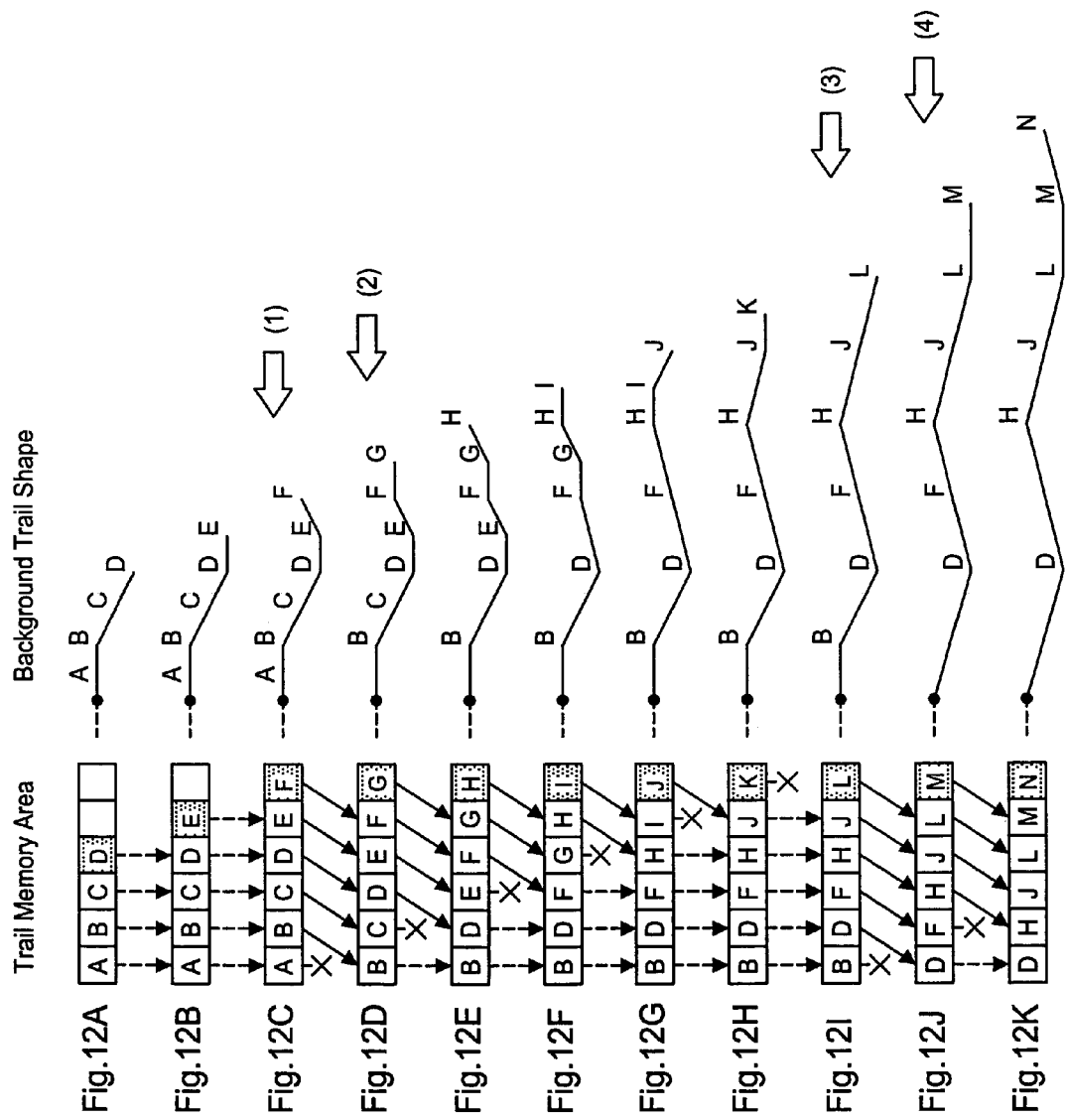

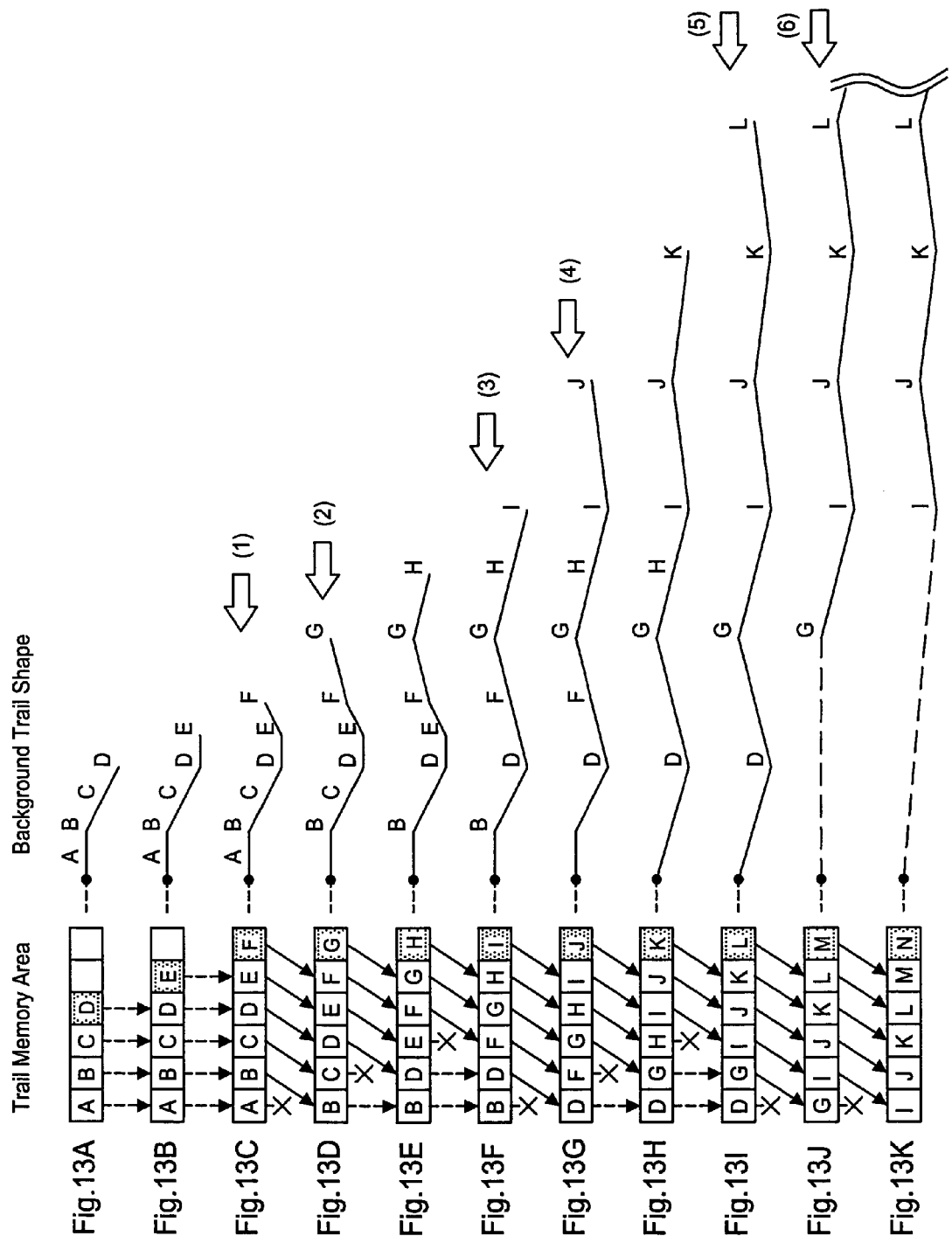

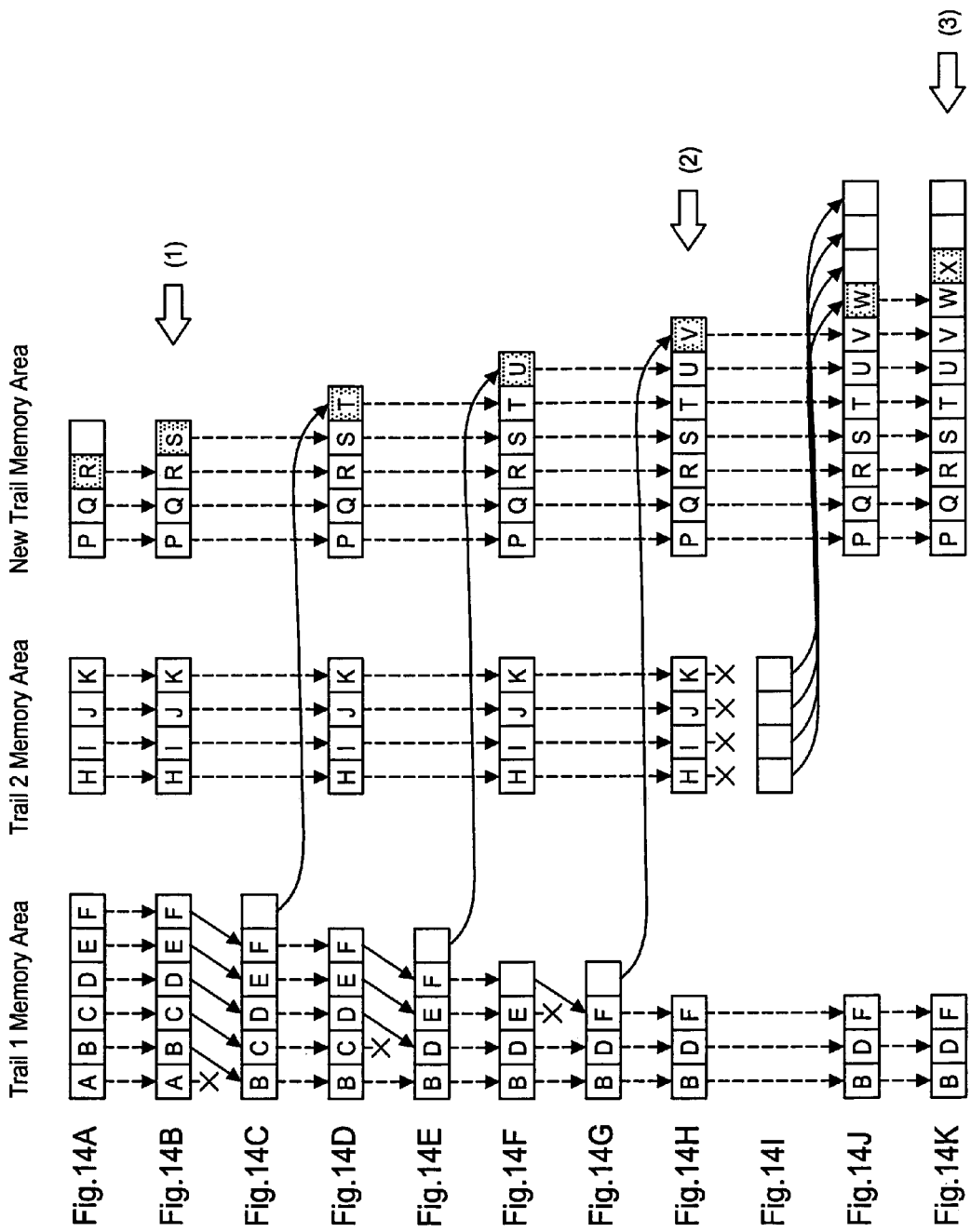

US 7,003,397 B2

OFF-ROAD TRAIL RECORDING METHOD AND APPARATUS FOR NAVIGATION SYSTEM

FIELD OF THE INVENTION

This invention relates to a navigation method and system for guiding a user to destinations, and more particularly, to an off-road trail recording method and apparatus for automatically recording the trail when a vehicle travels in an off-road area away from road segments in the map data of the navigation system, thereby enabling the user to know the trail of his travel and come back to the roads with use of the recorded off-road trail.

BACKGROUND OF THE INVENTION

A navigation system performs travel guidance for enabling a user to easily and quickly reach the selected destination. A typical example is a vehicle navigation system where a user drives a car having a vehicle navigation system. Such a navigation system detects the position of the vehicle, reads out map data pertaining to an area at the current vehicle position from a data storage medium, for example, a CD-ROM (compact disc read-only memory), a DVD (digital versatile disc), or a hard disc. Alternatively, such map data can be provided to the vehicle from a remote server through a communication network such as Internet. The navigation system displays a map image on a monitor screen while superimposing a mark representing the current location of the user's vehicle on the map image.

When a destination is set, the navigation system starts a route guidance function for setting a guided route from the start point to the destination. To determine the guided route to the destination, the navigation system calculates and determines an optimum route to the destination based on various parameters. For example, the guided route is determined based on the shortest way to reach the destination, the route preferring freeways to surface roads, the least expensive way to the destination, or the route without using toll road, and the like.

Typically, the route guidance function performs an intersection guidance process in which a monitor screen displays an enlarged intersection diagram and the direction in which the vehicle is to travel while displaying the guided route on a map. During the route guidance, the navigation system reads the nodes data from the data storage medium such as DVD and successively stores the nodes data of road segments (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a user of the desired one of roads or directions selectable at the intersection. Such route guidance by the navigation system is also given by voice instruction.

As in the foregoing, the navigation system is able to guide the user to the destination through the calculated route. However, when the vehicle travels in an off-road area, such as mountains or desert, etc., where no road segments data is provided in the map data storage of the navigation system, it is not possible for the navigation system to guide the user. Moreover, when the vehicle is away from the roads, and if the user does not remember the trail of the travel to the current position, he may not be able to go back to the roads.

U.S. Pat. No. 6,356,837 (the '837 patent) provides a navigation system which is able to record the trail of the off-road travel in a memory. Typically, such a trail of the off-road travel is displayed on a map image on a screen of the navigation system based on the data recorded in the memory. The navigation system disclosed in the '837 patent includes an automatic mode and a manual mode for recording the off-road trail. In the automatic mode, the navigation system automatically starts recording the trail when the vehicle position is away from the roads (off-road). In the manual mode, a user controls ON/OFF of the off-road trail of the navigation system.

The automatic mode prevents the user from inadvertently forgetting to start the recording when the vehicle leaves the road. However, this mode would exhaust the available memory space for trail recording more quickly compared to the driver's judicious use of the manual mode recording. This is because the automatic trail mode will keep recording the vehicle movements even when the user does not need any recording, such as driving in a large parking lot of a neighborhood shopping mall (where the map database does not have any streets).

Also, in the automatic mode, if the vehicle runs on a rural highway in an area where the map database is not yet available, the trail memory can be exhausted in a short time. Increasing the size of trail memory would raise the hardware cost, and may introduce another problem. Deleting unwanted trail recordings would become time consuming because the user would have to review an excessive number of trails before deletion.

In the manual mode, in the case where the user forgets to turn on the off-road travel recording until he has already been driving far away from the roads, it is not possible to record the off-road trail from the roads to the current position. Therefore, there arises a problem that not only the off-road trail data is incomplete, but also the user may not be able to return to the original road. Further, in the '837 patent, when the trail memory has not a sufficient capacity such as when the memory is full or almost full, it is not possible to record the off-road trail.

SUMMARY OF THE INVENTION

It is, therefore, an object of the present invention to provide an off-road trail recording method and apparatus for use with a navigation system for recording an off-road trail without regard to on/off settings of the off-road trail recording function by the user.

It is another object of the present invention to provide an off-road trail recording method and apparatus for use with a navigation system which is capable of automatically detecting that the vehicle has left the road and entered an off-road area and starts recording the off-road trail in a background recording mode.

It is a further object of the present invention to provide an off-road trail recording method and apparatus for use with a navigation system for recording an off-road trail which is capable of providing various means for recording the off-road trail with reduced resolution when the memory capacity is insufficient.

It is a further object of the present invention to provide an off-road trail recording method and apparatus for use with a navigation system for recording an off-road trail which is capable of providing means for creating a memory space for recording the off-road trail when the memory capacity is insufficient.

The present invention is an off-road trail recording method for use with a navigation system for recording an off-road trail when a user or user's vehicle travels in an off-road area such as deserts and mountains for guiding the user to safely return to the original road.

The off-road trail recording method is comprised of the steps of detecting whether a vehicle has left a road and entered an off-road area where no road segment data is available, recording off-road trail data in a background recording mode in response to vehicle's travel in the off-road area when detecting that the vehicle has left the road, selecting whether to recover or delete the off-road trail data recorded in the background recording mode indicating the off-road trail connecting the road left off and a current vehicle position when a normal recording mode is activated, and recording off-road trail data and displaying the off-road trail data on a screen of the navigation system in the normal recording mode in response to vehicle's travel in the off-road area. The background recording mode is activated automatically when detecting that the vehicle has left the road, and the normal recording mode is activated by the user by turning on the off-road trail recording function of the navigation system.

The off-road trail recording method further comprises a step of displaying the off-road trail connecting the road left off and the current vehicle position on the navigation system when the user selects to recover the off-road trail data recorded in the background recording mode.

In the background recording mode, the off-road trail data is stored in an unused memory area of an off-road trail data storage continuously. If there is no unused memory space, the off-road recording will be conducted by writing the newest data over the oldest data. In such a situation, the off-road trail data may also be recorded with resolution lower than the standard resolution when a memory capacity of an off-road trail data storage is exhausted or insufficient. The method of recording the off-road trail data with lower resolution is to thin out the off-road trail data when storing the off-road trail data in the off-road trail data storage.

In the background mode or normal mode, the method of thinning out the off-road trail data is determined as to whether to thin out newest points of the off-road trail data or oldest points of the off-road trail data. Further, the method of thinning out the off-road trail data is determined based on parameters including a distance, a time or a combination thereof. Further, the method of thinning out the off-road trail data is determined based on parameters including straight or curvature of the off-road trail or surface roughness of the off-road trail.

Another aspect of the present invention is an off-road trail recording apparatus for use with a navigation system and is comprised of various means for implementing the off-road trail recording method described above, thereby guiding the user to safely return to the original road.

According to the present invention, the off-road trail recording is achieved by the navigation system without regard to on/off settings of the off-road trail recording function by the user. The navigation system automatically detects that the vehicle has left the road and entered an off-road area and starts recording the off-road trail in the background mode. When the user turns on the off-road trail recording function later, the navigation system prompts the user to decide whether the off-road trail recorded in the background should be recovered.

The off-road trail recording method and apparatus of the present invention provides various means for recording the off-road trail with reduced resolution when the memory capacity is insufficient. Typically, a thin out method is used to record the off-road trail with lower resolution to save the memory in which off-road trail data is acquired with a larger interval of points on the trail. Further, the off-road trail recording method and apparatus of the present invention provides means for creating a memory space for recording the off-road trail when the memory capacity is insufficient.

BRIEF DESCRIPTION OF THE DRAWINGS

FIGS. 1A–1H are diagrams showing an example of process and screen display of the navigation system for implementing the off-road trail method and apparatus of the present invention.

FIGS. 3A–3O are diagrams showing an example of process and screen display of the navigation system for implementing the off-road trail recording method and apparatus of the present invention when the off-road trail data storage has a sufficient memory capacity.

FIGS. 4A–4P are diagrams showing an example of process and screen display of the navigation system for implementing the off-road trail recording method and apparatus of the present invention when the memory capacity of the off-road trail data storage is insufficient.

FIGS. 5A–5P are diagrams showing another example of process and screen display of the navigation system for implementing the off-road trail recording method and apparatus of the present invention when the memory capacity of the off-road trail data storage is insufficient.

FIG. 11 is a flow chart showing an example of process of the off-road trail recording method corresponding to the routine (D) of FIG. 7.

FIGS. 12A–12K are diagrams showing an example of trail memory areas and background trail shapes recorded in the trail memory in accordance with the present invention.

FIGS. 13A–13K are diagrams showing a further example of trail memory areas and background trail shapes recorded in the trail memory in accordance with the present invention.

FIGS. 14A–14K are diagrams showing an example of method for recording the off-road trail in the trail memory while creating a new trail memory area in accordance with the present invention.

DETAILED DESCRIPTION OF THE INVENTION

Figure 2A:
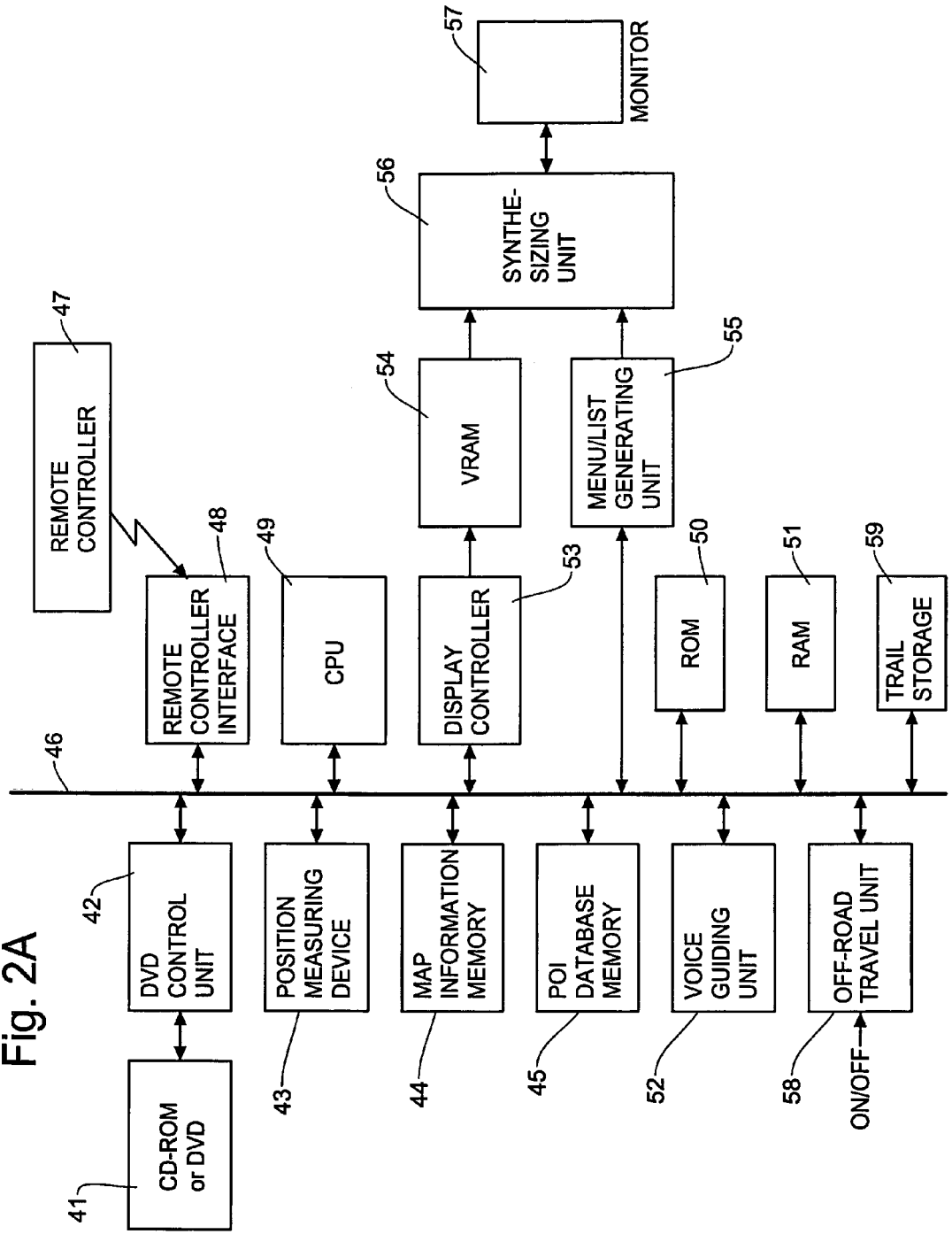
FIG. 2A is a block diagram showing an example of structure in the vehicle navigation system for implementing the off-road trail recording of the present invention.

The present invention will now be described in more detail with reference to the accompanying drawings. The off-road trail recording of the present invention automatically records the off-road trail when the user or user's vehicle (hereafter "vehicle") departs from the road (road segment in the map data) without regard to on/off states of the off-road trail recording function. When the off-road trail recording function is off, such recording is done in a background recording mode, and when the off-road trail recording function is on, the recording is done in a normal recording mode.

In the background recording mode, the navigation system detects that the vehicle has left the road and starts the off-road trail recording. The recorded off-road trail is not displayed on the navigation screen unless the off-road trail function is turned on by the user. When the off-road trail recording function is turned on by the user, the navigation system records the off-road trail in the normal mode (rather than the background mode) and displays the off-road trail on the navigation screen.

In the case where the off-road trail recording function is turned on substantially after the vehicle had left the road, the navigation system prompts the user to recover the off-road trail data recorded in the background recording mode. When the user wants to recover the data, the navigation system displays the off-road trail connecting the last road to the current vehicle position. Depending on the memory capacity of the off-road trail data storage and the instructions by the user, the navigation system provides various options to display, register (record the data with file name), delete, thin out, etc. the off-road data.

FIGS. 1A–1H show an example of overall procedure and screen display involved in the navigation system implementing the off-road trail recording method and apparatus of the present invention. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen. However, in this situation, the navigation system does not perform the route guidance function because the destination is not specified.

FIGS. 1B–1D show an example of process for specifying a destination in the navigation system. A main menu screen such as shown in FIG. 1B displays menu items including a "Destination" menu for entering the destination. When selecting the "Destination", the navigation system displays an "Enter Destination by" screen as shown in FIG. 1C for specifying an input method for selecting the destination. The "Enter Destination by" screen lists various methods for selecting the destination including "Address" for specifying the city and address of the destination, "Intersection" for specifying the names of two streets in the city which intersect with one another, and "Point of Interest" (POI) for selecting the programmed destination based on the name, category or telephone number. Other methods in the "Enter Destination by" screen include "Recent Route" for specifying the destination based on the recent destinations saved in the navigation system, "Address Book" for selecting the address of the destination out of the addresses stored in the system, and "Today's Plan" for specifying two or more destinations in the navigation system.

When selecting, for example, the "Address" in FIG. 1C, the navigation system displays an "Enter Street Name" screen such as shown in FIG. 1D. The screen of FIG. 1D is basically a keyboard for inputting the address in an address input box on the monitor screen. The user inputs the street name and number in the address input box through the key board.

FIG. 1E shows a "Confirm Route" screen of the navigation system for confirming the destination. In this example, the "Confirm Route" screen lists the name, address and phone number of the destination. If this is a correct destination, the user enters a "OK to Proceed" key to proceed to the next procedure.

In FIG. 1F, the navigation system calculates and determines a guided route to the current destination. The navigation system determines a route to the destination based on, for example, the shortest way to reach the destination, the route using as many freeways as practical or the route without using toll road, and the like. In this example, the navigation system displays a progress scale of the calculation of the route.

After determining the guided route, the navigation system starts the route guidance as shown in FIG. 1G. The navigation system shows the intersection which is highlighted to show the next turn and a direction of the turn. Such route guidance by the navigation system is also given by voice instruction.

The route guidance is effective only when the vehicle is on the road because the road segments data are available through the map data medium. Such road segments data are not available if there is no road. Therefore, as shown in FIG. 1H, when the vehicle is away from the roads (off-road), such as when running in a desert or mountain area, etc., the route guidance function of the navigation system will not work. In such a situation, it is preferable to record the off-road trail from the road recently left to the current position of the user so that the user can successfully trail back to the original road.

In leisure or sports, a user desires to go deep in the mountains or drives about in the desert or wilderness where no roads are available, or a user wants to go to summer cabins without accessible roads deep in the mountains, and the like. After such driving or walking, the user has to go back to the road he had originally left so as to return home or to travel to the next destination. The present invention provides a useful means for recording the off-road trail even when the user forgets to set the navigation system to record the off-road trail.

The off-road trail recording method and apparatus in the present invention can be advantageously implemented in a vehicle navigation system. FIG. 2A shows an example of structure of a vehicle navigation system. The navigation system includes a map storage medium 41 such as a CD-ROM, DVD, hard disc or other storage means (hereafter "DVD") for storing map information. The block diagram also includes a DVD control unit 42 for controlling an operation for reading the map information from the DVD, a position measuring device 43 for measuring the present vehicle position. The position measuring device 43 has a vehicle speed sensor for detecting a moving distance based on speed pulses, a gyroscope for detecting a moving direction, a microprocessor for calculating a position and direction, a GPS receiver, etc.

The block diagram of FIG. 2A further includes a map information memory 44 for storing the map information which is read out from the DVD 41, a database memory 45 for storing point of interest (POI) information, etc. read out from the DVD 41, a remote controller 47 for executing a menu selection operation, an enlarge/reduce operation, a destination input operation, etc. and a remote controller interface 48.

The remote controller 47 of the navigation system is provided with selecting menus, executing selected functions, etc. The navigation system usually includes various other input methods to achieve the same and similar operations done through the remote controller. For example, a navigation system may include hard keys and a joystick on a head unit of the navigation system mounted on a dash board, a touch screen formed on the display panel, and voice communication means.

In the block diagram of FIG. 2A, the navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guided route, a voice interface and guiding unit 52 for voice communication interface and spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, and a monitor (display) 57.

The navigation system further includes an off-road travel unit 58 for controlling an off-road trail recording procedure of the present invention. An off-road trail data storage 59 is provided to store the trail data of the vehicle's off-road travel. Typically, an operation of the off-road trail data storage 59 is controlled by the off-road travel unit 58. The off-road trail data storage 59 can be a memory dedicated to the off-road trail data recording or a part of other storage such as a RAM 51 or a hard disc (not shown) in the navigation system.

Figure 2B:
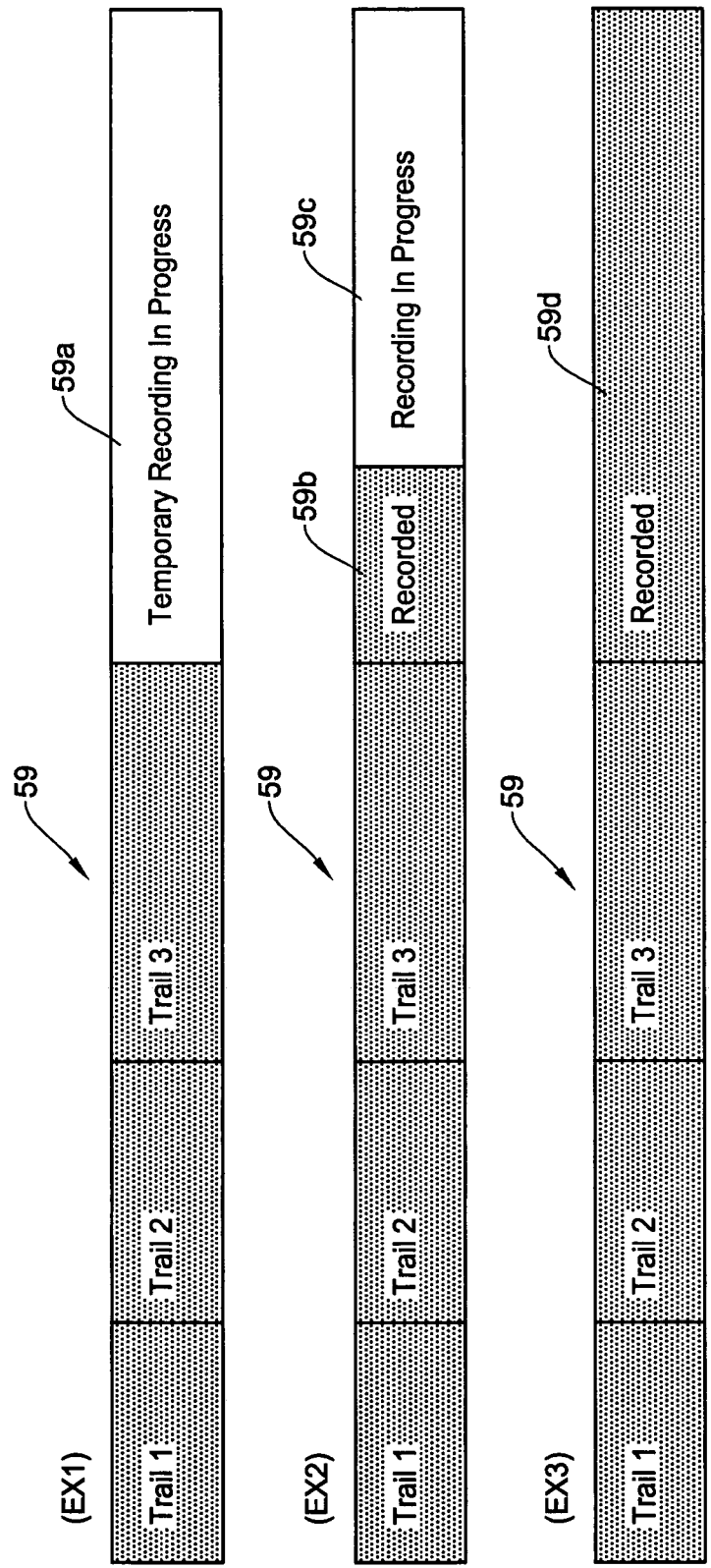
FIG. 2B is a schematic diagram showing examples of memory structure of a data storage in the block diagram of FIG. 2A for storing the off-road trail data therein.

FIG. 2B shows an example of structure of the off-road trail data storage 59 for storing the off-road trail data. Trails 1–3 in the hatched area in examples EX1–EX3 indicate that the off-road trail data for trails 1–3 are recorded with file names specified by the user. In other words, the off-road data of trails 1–3 are registered. The example EX1 indicates that the current trail is recorded in an unused memory area 59*a* of the off-road trail data storage 59. The example EX2 indicates that the trail data is recovered (trail data recorded in a background mode is utilized in a normal mode) and recorded in the memory area 59*b* while the current trail is recorded in the unused memory area 59*c*. The example EX3 indicates that the trail data is too large so that it is not possible to recover the trail data from the original point.

More detailed manner of data storage will be further explained later with reference to the process and screen examples of FIGS. 3–5. Throughout this example, a dotted line with an arrow between two display screens indicates that the user or user's vehicle travels from the previous screen to the current screen. Throughout the examples in FIGS. 3–5, reference labels M1 and M2 indicate mountains in the off-road area. A reference labels R1 indicates a river in the off-road area, and a reference VP indicates a current vehicle position.

FIGS. 3A–3O are diagrams showing an example of process and screen display of the navigation system of the present invention when the off-road trail data storage 59 for off-road trail recording has a sufficient memory capacity such as in the example EX1 of FIG. 2B. FIG. 3A shows a situation where a user (vehicle position VP) is still on the road but is about to enter an off-road area. As noted above, in the present invention, the navigation system records the off-road trail of the vehicle when the vehicle enters an off-road area without regard to whether the off-road trail function is turned on or not. When the off-road trail recording function is not turned on by the user, such recording is done in the background recording mode. When the off-road trail is turned on by the user, such recording is done in the normal recording mode.

In either the background recording mode or normal recording mode, when the memory capacity of the off-road data storage 59 is sufficient in the examples of FIGS. 4 and 5, such recording is conducted by storing the trail data (typically, a position of each sample point expressed by latitude and longitude) with standard resolution. Namely, the off-road trail data is stored in the unused memory area such as 59*a* in FIG. 2B at every predetermined interval of distance such as 100 meters in a normal interval (standard resolution). Other example of the normal interval is a predetermined interval of time, such as every 5 seconds or 10 seconds.

In a further example, the standard resolution is a combination of distance and time, such as every relatively long time (ex. 10 seconds) when the vehicle speed is low (ex. less than 10-meter/second), or every relatively long distance (ex. 200 meters) when the vehicle speed is high (ex. more than 20-meter/second). In a further example, a distance interval is small (minimum 10 meters) when a trail is curved while a distance interval is large (maximum 500 meters) when a trail is straight. It is also possible to change the data resolution based on the surface condition of the off-road, such as a larger distance interval when the surface is relatively smooth while a shorter distance interval when the surface is rough.

When the memory capacity is not sufficient, the navigation system provides options to make a space in the memory by changing the intervals, i.e., thinning out (lowering the data resolution) the trail data. Such a thin out mode can be used in the background recording mode as well as in the normal recording mode. Further, the thin out method can be applied to the existing (registered) off-road trail data or the current recording of the off-road trail data or both the preexisting data and current data.

The off-road trail data recorded in the background mode is not displayed or registered unless the user specifically instructed to do so after turning on the off-road trail recording function. FIG. 3A shows a situation where the user turns on this function by pressing the "Trail ON" button. Then, as shown in FIG. 3B, the navigation system displays a message box 62 indicating an available distance to be recorded in the off-road data storage. In this example, the message reads "Up to 24 miles (483 pts) of trail can be recorded" where "483 pts" means that the maximum length of 24-mile trail will be recorded by 483 points and displayed on the screen.

By pressing an OK key in FIG. 3B, the navigation system starts the trail recording in FIG. 3C. Preferably, the navigation system displays an icon 64 indicating that the navigation system is conducting the off-road trail recording. Accordingly, the navigation system is in the normal recording mode (rather than the background recording mode). Thus, when the vehicle travels in the off-road area as shown by the current vehicle position VP in FIG. 3H, the navigation system records and displays the off-road trail TR on the screen. As shown in FIG. 3H, the off-road trail TR connects the last road from which the vehicle has left and the current vehicle position VP. Accordingly, if the user wants to go back to the last road, the navigation system guides the user to travel back on the recorded trail TR to the road.

FIG. 3D shows a situation where the vehicle further advances from the situation of FIG. 3A and is now in the middle of the off-road area. In this example, it is assumed that the user did not turn on the trail recording function in FIG. 3A when leaving the road because, for example, of forgetting to activate this function. The user realized this fact when he is already well in the off-road area as in FIG. 3D and now turns on the off-road trail recording. In the present invention, without regard to the "Trail ON" or "Trail OFF" key, the navigation system automatically detects that the vehicle has left the road and starts recording the off-road trail in the background mode.

Because the user presses the "Trail ON" key in FIG. 3D, the navigation system displays a message box 66 which asks the user as to from which point the off-road trail recording should be started as shown in FIG. 3E. An example of message is "Do you want to begin the trail from the road you left off or from right here?". The message box 66 includes keys indicating "Road" and "Here" for the user to select one of the keys. If the user cancels by pressing the cancel key (not shown), the navigation system goes back to the previous screen of FIG. 3D. When the off-road trail recording is canceled, the navigation system does not display the trail when the vehicle further travels the off-road area as shown in FIG. 3O although the off-road trail recording in the background will be continued.

In the message box 66 in FIG. 3E, when selecting the "Road", the navigation system records and displays the off-road trail from the last road that the vehicle left. When selecting the "Here" key, the navigation system records and displays the off-road trail starting from the current vehicle position VP. In other words, if the "Here" key is selected, the navigation system discards the off-road trail data produced in the background recording mode from the last road to the vehicle position VP.

FIG. 3F shows a display example when the user selects the "Road" key in FIG. 3E. Thus, the navigation system displays the off-road trail TR from the last road to the current vehicle position VP. Because the trail recording is conducted all the time in the background mode, the navigation system is able to display the off-road trail TR by recovering the recorded trail data defining positions of many points connecting the last road and the vehicle position VP. Thus, in the normal recording mode, the navigation system continues recording and displaying the off-road trail TR in response to the further travel of vehicle.

FIG. 3G shows a display example when the user selects "Here" key in FIG. 3E. Thus, the navigation system records and displays the off-road trail starting from the current vehicle position VP. Since the user selects to record and display the off-road trail from the current vehicle position VP (rather than from the last road), the trail data recorded in the background from the last road to the current vehicle position VP will be deleted. Thus, the navigation system records and displays the off-road trail starting from the vehicle position VP in response to the travel.

As shown in FIG. 3I, upon further travel of the vehicle from the location in FIGS. 3F–3H, the navigation system records and displays the off-road trail TR. It should be noted that the off-road trail at the first part will not be displayed in the case where the vehicle travels from the situation of FIG. 3G, since the trail recording starts from the vehicle position VP in FIG. 3G. If the user wants to stop recording the off-road trail, such as when the travel to the target location has been completed, he hits the "Trail OFF" key in FIG. 3I.

Then, the navigation system displays a message box 68 such as shown in FIG. 3J which asks the user as to how the recorded off-road trail data should be treated. An example of message is "Do you want to stop recording the trail and save it for later use?". The message box 68 includes keys indicating "Save", "Continue" and "Discard" for the user to select one of the keys.

In the message box 68 in FIG. 3J, when selecting "Save", the navigation system shows a keyboard screen in FIG. 3K to assign a file name to the recorded data. Thus, by using the keyboard of FIG. 3K, the user defines a name of the recorded data such as "Camp site" and presses a save key on the screen. Accordingly, the off-road trail data named "Camp site" is registered in the off-road trail data storage 59 in the manner shown in FIG. 2B (Trail 1–3).

As shown in FIG. 3N, since the navigation system is not in the "Trail ON" state, when further traveling the off-road area, the navigation system does not display the off-road trail. Namely, in the normal recording mode, the navigation system will not display the off-road trail from the point where the system is set to the "Trail OFF" state. However, since the vehicle is in the off-road area and the off-road data storage has an unused memory area, the off-road trail data is automatically recorded in the background mode.

In FIG. 3J, when selecting "Continue", the navigation system goes back to the screen of FIG. 3I to continue recording and displaying the off-road trail recording. Since the navigation system is returned to the "Trail ON" state, when further traveling the off-road area, the navigation system records and displays the off-road trail TR continuously with the previously recorded trail as shown in FIG. 3M. Thus, the user can easily go back to the last road by trailing back the recorded off-road trail.

In FIG. 3J, when selecting "Discard", the navigation system deletes the recorded trail data and the trail display in a manner as shown in FIG. 3L. The navigation system is now in the "Trail OFF" state, and the previously recorded off-road trail data has been discarded. Accordingly, when the vehicle further travels in the off-road area, the navigation system no longer displays the off-road trail but only shows a current vehicle position VP on the map image in a manner of FIG. 3O. In the background mode, however, since the vehicle is in the off-road area and the off-road data storage has an unused memory area, the off-road trail data is recorded either from the current position after discarding the previous trail data or continuously with the previously recorded trail data without discarding the trail data at least in the background mode.

FIGS. 4A–4P are diagrams showing another example of process and screen display of the navigation system of the present invention when the off-road trail data storage 59 for off-road trail recording has not a sufficient memory capacity as in the example EX2 of FIG. 2B. Such a situation arises even when the trail data storage 59 has a relatively large capacity, because the memory capacity may not be sufficient when the distance of the off-road trail is large. In other situation, the memory capacity may be insufficient when a substantial portion of the memory is already used.

In the embodiment of FIGS. 4A–4P, when an unused memory space is no longer available or when the memory capacity is insufficient, the background recording mode is performed in a lower resolution mode by thinning out the trail data. However, the normal recording mode does not have such a lower resolution mode, thus the off-road trail recording is stopped when the off-road trail data storage 59 does not have sufficient memory capacity. As noted above, in the example of FIGS. 4A–4P, a dotted line with an arrow between two display screens indicates that the user or user's vehicle travels the locations from the previous screen to the current screen.

FIG. 4A shows a situation where the vehicle (expressed by vehicle position VP) is still on the road segments but is about to enter an off-road area. As noted above, in the present invention, the navigation system records the off-road trail of the vehicle automatically when the vehicle left the road even when the off-road trail recording function is not turned on by the user, i.e., it is recorded in the background recording mode. When the unused memory area has exhausted, the trail recording is conducted by storing the trail data in a thinning out fashion by reducing the number of points on the trail for recording the trail data over the old data. Alternatively, the trail recording by the thinning out mode can be conducted when the unused memory area exists such as the unused memory area 59*a* or 59*c* in FIG. 2B but the memory space is insufficient. In the thin out mode, the trail data is acquired for points, for example, of longer distance such as every 200 or 300 meters (rather than such as 100 meters in the standard resolution).

Such off-road trail data recorded in the background recording mode is not displayed or registered unless the user specifically instructed to do so by turning on the off-road trail recording function (Trail ON). In FIG. 4A, when the vehicle goes into the off-road area, the user presses the "Trail ON" key. Then, as shown in FIG. 4B, the navigation system displays a message box 62 indicating an available distance to be recorded in the off-road data storage. In this example, the message reads "Up to 12 miles (241 pts) of trail can be recorded" where "241 pts" means that the maximum trail length of 12 miles will be recorded by 241 points and be displayed on the screen.

By pressing an OK key in FIG. 4B, the navigation system starts the trail recording in FIG. 4C in the normal recording mode. Preferably, the navigation system displays an icon 64 indicating that the navigation system is conducting the trail recording. Thus, when the vehicle travels in the off-road area as shown by the current vehicle position VP in FIG. 4F, the navigation system records and displays the off-road trail TR on the screen. The off-road trail TR shown on the navigation screen is a trail of the vehicle connecting the last road that the vehicle left and the current vehicle position VP. Accordingly, if the user wants to go back to the road, the navigation system guides the user to backtrack the recorded off-road trail TR.

FIG. 4D shows a situation similar to that of FIG. 3D where the vehicle further advances from the situation of FIG. 4A and well in the off-road area without turning on the off-road trail recording function either intentionally or unintentionally. It is assumed that the user is already 14 miles from the last road, and he now wants to record and display the off-road trail and turns on the off-road trail recording function. As noted above, when the vehicle left the road, the navigation system of the present invention automatically starts the off-road trail recording without displaying the trail on the screen (background recording mode). However, in this case, since the memory capacity available for the recording is insufficient, the off-road trail recording in the background is conducted in the low resolution mode by thinning out the data. The low resolution mode will be started at the time when the available memory space is exhausted or before completely exhausting the memory space depending on the set-up conditions in the navigation system.

In the low resolution mode, because the off-road trail is recorded in the background recording mode at coarse points (thinning out), it is possible to display the off-road trail between the last road and the current position. However, the navigation system is not able to continue the off-road trail recording in the normal recording mode, because the distance (14 miles) from the road exceeds the maximum possible distance (12 miles) for the off-road trail recording in the normal mode. This is because the normal mode in this example does not use the lower resolution mode, i.e., thinning out the trail data.

Thus, when the user sets the "Trail ON" key, the navigation system displays a message box 74 which asks the user as to whether the trail recording in the normal mode should be started anew or the user should backtrack. An example of message is "Do you want to backtrack the trail to the road you left off (14 miles away)?". The message box 74 includes keys indicating "Backtrack" and "Start Anew" for the user to select one of the keys. If the user cancels the current screen, the navigation system goes back to the previous screen of FIG. 4D.

In the message box 74 shown in FIG. 4E, if the user selects the "Backtrack" menu, the navigation system recovers the off-road trail from the last road that the vehicle left to the current vehicle position VP. When selecting the "Start Anew" menu, the navigation system records and displays the off-road trail starting from the current vehicle position VP in the normal recording mode. In other words, if the "Start Anew" key is selected, the navigation system discards the off-road trail data from the last road to the current vehicle position VP produced in the background recording mode.

FIG. 4G shows a display example when the user selects the "Backtrack" key in FIG. 4E, although this process may not always be necessary. Since the off-road data storage 59 does not have an unused memory area sufficient to continue the off-road trail recording, the navigation system is not able to record and display the off-road trail TR for the upcoming trail in addition to the current off-road trail from the last road to the current vehicle position VP. Thus, when the "Backtrack" is selected, the navigation system displays a keyboard screen 72 to assign a file name for the trail data recorded in the background. By inputting the file name and pressing the "Save" key, the off-road trail data with the assigned name is registered in the navigation system in the manner shown in FIG. 2B.

Thus, in FIG. 4J, the navigation system displays the off-road trail TR from the road left and the current vehicle position VP. Alternatively, when the user selects the "Backtrack" key in FIG. 4E, the navigation system moves to the screen of FIG. 4J without the registration process of FIG. 4G. In FIG. 4J, the navigation system recovers the trail data recorded in the background mode and displays the off-road trail TR reproduced therefrom. As noted above, since the background trail recording has been conducted by the thin out mode, the number of points on the off-road trail for a predetermined distance is smaller than that of the normal mode in the example of FIGS. 3A–3O. In FIG. 4M, since the off-road trail recording is no longer available, the user may want to go back to the road left off which is guided by the navigation system through the recorded off-road trail.

FIG. 4H shows a display example when the user selects the "Start Anew" key in FIG. 4E. In this setting, the navigation system records and displays the off-road trail starting from the current vehicle position VP. Since the off-road data storage 59 does not have enough memory capacity, the navigation system discards the trail data recorded in the background mode from the last road to the current vehicle position VP. Thus, in FIG. 4H, the off-road trail between the road left off and the current vehicle position VP is not displayed on the screen. The navigation system records and displays the off-road trail starting from the vehicle position VP in response to the further travel by the user or user's vehicle in FIG. 4H.

In recording and displaying the off-road trail in the normal mode of FIG. 4F, if the off-road trail data storage becomes full, the navigation system displays a message box 76 which indicates that the memory is full in FIG. 4I. In the message box, the navigation system asks the user whether the pre-registered trail data be deleted to make a memory room or the off-road trail recording be stopped. An example of message is "Trail memory is full. Do you want to save the trail now or make room?". The message box 76 of FIG. 4I includes keys indicating "Make Room" and "Save" for the user to select one of the keys.

In the message box 76 of FIG. 4I, when selecting "Make Room", the navigation system shows a screen 78 such as shown in FIG. 4K for deleting existing trail data. The screen 78 shows a list of trails registered in the off-road trail data storage 59 where each trail data is expressed by the name and distance. The user scrolls the list and selects a trail name that can be deleted from the off-road data storage, thereby making a memory space. In the example of FIG. 4K, the trail name "VISTA POINT" in the list is selected by the user.

By selecting the trail name and pressing the enter key, the navigation system displays a confirmation screen 80 to confirm the item selected by the user as shown in FIG. 4N. An example of message on the confirmation screen 80 is "Are you sure you want to delete the 7.9-mile trail "VISTA POINT"?. The confirmation screen 80 includes a "Delete" key and a "Cancel" key for the user to select one of them. If the "Cancel" key is pressed, the navigation system goes back to the list screen of FIG. 4K. If the "Delete" key is pressed, the navigation system deletes the off-road trail data of "VISTA POINT", thereby creating the memory space in the data storage. Thus, for the further travel, the off-road trail is continuously recorded and displayed as shown in FIG. 4P.

In the message box 76 of FIG. 4I, when selecting the "Save" key, the navigation system displays the keyboard screen 72 to assign a file name for the trail data recorded so far as shown in FIG. 4L. By inputting a name of the trail data and pressing the "Save" key, the off-road trail data with the assigned file name is registered in the navigation system in the manner shown in FIG. 2B. Since there is no more unused memory area, the navigation system does not record or display the off-road trail thereafter in FIG. 4O.

FIGS. 5A–5P are diagrams showing a further example of process and screen display of the navigation system of the present invention when the off-road trail data storage 59 for off-road trail recording has not a sufficient memory capacity as in the example EX2 of FIG. 2B. In the embodiment of FIGS. 5A–5P, when an unused memory space is unavailable or when the unused memory capacity is insufficient, the background recording mode is performed in a lower resolution mode by thinning out the trail data. Further, it is so designed that the normal recording mode can also be performed, when the memory capacity is exhausted or insufficient, in a lower resolution mode by thinning out the trail data. The low resolution mode will be started at the time when the available memory space is exhausted or before completely exhausting the memory space depending on the set-up conditions in the navigation system.

FIG. 5A shows a situation where a user (vehicle position VP) is still on-road but is about to enter an off-road area. As noted above, in the present invention, the navigation system records the off-road trail of the vehicle automatically when the vehicle left the road even when the off-road trail recording function is not turned on by the user, i.e., it is recorded in background recording mode. When the unused memory area has exhausted, the trail recording is conducted by storing the trail data in a thinning out fashion by reducing the number of points on the trail for recording the trail data over the old data. Alternatively, the trail recording by the thinning out mode can be conducted when the unused memory area exists such as the unused memory area 59a or 59c in FIG. 2B but the memory space is insufficient. In the thin out mode, the trail data is acquired for points, for example, of longer distance such as every 200 or 300 meters (rather than such as 100 meters in the normal recording mode).

Such off-road trail data recorded in the background mode is not displayed or registered unless the user specifically instructed to do so by tuning on the off-road trail recording function. In the case of FIG. 5A, when the vehicle goes into the off-road area, the user presses the "Trail ON" button. Then, as shown in FIG. 5B, the navigation system displays a message box 62 indicating an available distance to be recorded in the off-road trail data storage. In this example, the message reads "Up to 12 miles (241 pts) of trail can be recorded" where "241 pts" means that the maximum trail length of 12 miles will be recorded by 241 points and be displayed on the screen.

By pressing an OK key in FIG. 5B, the navigation system starts the off-road trail recording in the normal mode in FIG. 5C. Preferably, the navigation system displays an icon 64 indicating that the navigation system is conducting the trail recording. Thus, when the vehicle travels in the off-road area as shown by the current vehicle position VP in FIG. 5F, the navigation system records and displays the off-road trail TR on the screen. The off-road trail TR displayed on the screen is a trail of the vehicle from the last road that the vehicle left to the current vehicle position VP. Accordingly, if the user wants to go back to the original road, the navigation system guides the user to backtrack the recorded off-road trail TR.

FIG. 5D shows a situation similar to that of FIG. 4D where the vehicle further advances from the situation of FIG. 5A and in the middle of the off-road area without turning on the off-road trail recording function either intentionally or unintentionally. It is assumed that the user is now 14 miles away from the last road, and now turns on the off-road trail recording function. As noted above, the navigation system of the present invention automatically detects that the vehicle has left the road and starts the off-road trail recording without displaying on the screen in the background recording mode. However, in this case, since the memory capacity available for the recording is insufficient for the normal interval (standard resolution) points, the off-road trail recording in the background mode and normal mode is conducted in the low resolution mode by using the thin out method.

In this example, since the off-road trail is recorded in the background by coarse points (thinning out), it is possible to display the off-road trail between the last road and the current position. The navigation system is able to continue the off-road trail recording in the normal mode, even though the distance (14 miles) from the road exceeds the maximum possible distance (12 miles). This is because the normal mode in this example is able to use the thinning out method for the trail data.

Thus, when the user sets "Trail ON" in FIG. 5D, the navigation system displays a message box 84 in FIG. 5E which asks the user from which point the off-road trail recording in the normal mode should be started. An example of message is "Do you want to backtrack and thin out the trail to extend the range?". The message box 84 includes keys indicating "Extend" and "Start Anew" for the user to select one of the keys. If the user cancels the current status, the navigation system goes back to the previous screen of FIG. 5D.

In the message box 84 in FIG. 5E, when selecting the "Extend" menu, the navigation system records and displays the off-road trail from the last road to the current vehicle position by thinning out the trail data, i.e., extending the recordable distance. When selecting the "Start Anew" menu, the navigation system records and displays the off-road trail from the current vehicle position VP rather than from the last road. In other words, if the "Start Anew" key is selected, the navigation system discards the trail recording data produced in the background recording from the last road to the current vehicle position VP.

FIG. 5G shows a display example when the user selects the "Extend" key in FIG. 5E. Since the off-road trail data storage 59 does not have an unused memory area of sufficient capacity, the navigation system extends the possible recordable distance by thinning out the trail data. Various ways are possible for thinning out the trail data as will be described with reference to FIGS. 6A–6G. Thus, as shown in FIG. 5G, the navigation system recovers the trail data from the last road to the current vehicle position VP recorded in the background recording mode and displays the off-road trail TR reproduced therefrom. The navigation system continues to record and display the off-road trail in the extended mode (thinned out) in which the number of points on the off-road trail for a predetermined distance is smaller than that of the normal mode. Preferably, in FIG. 5G, the navigation system displays an icon 65 indicating that the navigation system is conducting the trail recording in the extended mode (thinning out mode).

By increasing the degree of extension (thin out), the off-road trail data can be recorded in the off-road trail data storage. However, if the trail data is too thinned out, and thus, no more meaningful off-road trail will be possible, the navigation system displays a message box 88 in FIG. 5J which asks the user how to deal with the off-road trail data currently recording. An example of message in the message box 88 is "Trail is too thinned out. Do you want to extend the range of current trail?". The message box 88 in FIG. 5J includes keys indicating "Extend" and "Save" for the user to select one of the keys.

In FIG. 5J, when selecting the "Extend" key, the navigation system displays a screen of FIG. 5K which shows a list of existing off-road trail data. When selecting the "Save" key, the navigation system displays a screen of FIG. 5L which shows a key board. Referring back to FIG. 5E, when selecting the "Extend" key and when there is no almost no memory space available, the navigation system also displays the screen of FIG. 5K. The screens of FIGS. 5K and 5L will be explained later with respect to the situation where the memory becomes full in FIG. 5I.

FIG. 5H shows a display example when the user selects the "Start Anew" key in FIG. 5E. Thus, the navigation system records and displays the off-road trail from the current vehicle position VP in the normal recording mode. The navigation system discards the trail data from the last road to the current vehicle position VP recorded in the background mode. Thus, in FIG. 5H, the off-road trail between the road left off and the current vehicle position VP is not displayed on the screen. The navigation system records and displays the off-road trail starting from the vehicle position VP in response to the further travel of the vehicle in FIGS. 5F and 5H.

In recording and displaying the off-road trail in FIG. 5F, if the off-road data storage becomes full, the navigation system displays a message box 86 which indicates that the memory is full in FIG. 5I. In the message box, the navigation system asks the user whether the recordable trail distance be extended by thinning out or deleting an existing off-road trail data. An example of message is "Trail memory is full. Do you want to extend the range of current trail?". The message box 86 of FIG. 5I includes keys indicating "Extend" and "Save" for the user to select one of the keys.

In the message box 86 of FIG. 5I, when selecting "Extend", the navigation system shows a screen 90 such as shown in FIG. 5K for selecting a method of extending the recordable range. One method is to delete the existing trail data and the other is to thin out the existing trail data, one of which can be selected on the screen 90. The screen 90 also shows a list of existing trail data registered in the off-road trail data storage 59 where each trail data is expressed by its name and distance. The user scrolls the list and selects the trail name that can be thinned out or deleted from the off-road trail data storage, thereby making a memory space. In this example, the trail name "OAK VALLEY" in the list is selected by the user.

By selecting the trail name and pressing the left key ("Delete"), the navigation system displays a confirmation screen 92 to confirm the item selected by the user. An example of message on the confirmation screen 92 is "Are you sure you want to delete the 3.4-mile trail "OAK VALLEY"?". The confirmation screen 92 includes a "Delete" key and a "Cancel" key for the user to select one of the keys. If the "Cancel" key is pressed, the navigation system goes back to the list screen of FIG. 5K. If the "Delete" key is pressed, the navigation system deletes the off-road trail data of "OAK VALLEY", thereby creating the memory space in the data storage. Thus, for the further travel, the off-road trail is continuously recorded and displayed in the normal recording mode as shown in FIG. 5P.

By selecting the trail name and pressing the right key ("Thin Out"), the navigation system displays a thin out screen 94 to select a method of thinning out the trail data for "OAK VALLEY" by the user. Examples of method for thinning out the trail data are listed on the screen 92 which include "Oldest trail points" in which the oldest trail points are thinned out, "Newest trail points" in which the newest trail points are thinned out, and "Straighter trail points" in which straighter trail points (rather than curved trail points) are thinned out. Various other thinning methods will also be explained later with reference to FIGS. 6A–6G. In this example, the "Oldest trail points" method is selected in FIG. 5N for low resolution recording, thereby creating the memory space in the data storage. Thus, for the further travel, the off-road trail is continuously recorded and displayed in the normal recording mode as shown in FIG. 5P.

In the message box 86 of FIG. 5I or in the message box 88 of FIG. 5J, when selecting the "Save" key, the navigation system displays the keyboard screen 72 to assign a file name for the off-road trail data recorded so far as shown in FIG. 5L. By inputting a name of the off-road trail data and pressing the "Save" key, the off-road trail data with the assigned file name is registered in the navigation system in the manner shown in FIG. 2B. Since there is no more unused memory area, the navigation system will not show or continue the off-road trail thereafter as in FIG. 5O.

Figure 6A:
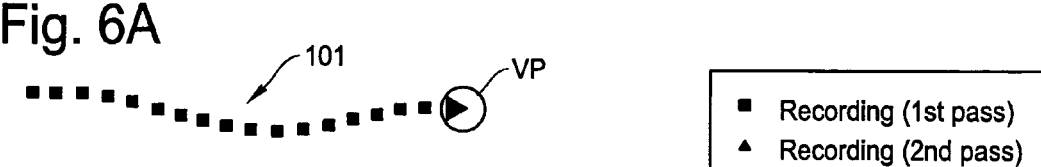
FIGS. 6A–6G are diagrams showing various ways for storing the off-road trail data in the memory when the remaining capacity of the memory is small while decreasing the data resolution.
Figure 6B:
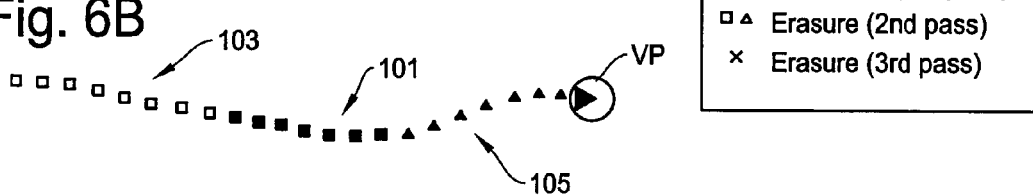

FIGS. 6A–6G show various methods for creating a memory room in the off-road trail data storage for storing the off-road trail data when no memory space is available for the normal recording mode. In FIG. 6A, off-road trail data 101 is recorded in the unused memory area of the off-road trail data storage 59 (FIGS. 2A–2B). Suppose the memory is full after this recording, a typical method for further recording the trail data is to erase the oldest trail data to be replaced with the newest trail data, which is shown in FIG. 6B. Thus, in FIG. 6B, data 103 is erased and new data 105 is stored in the off-road trail data storage 59, i.e., the navigation system replaces the oldest trail data with the newest trail data.

Figure 6C:
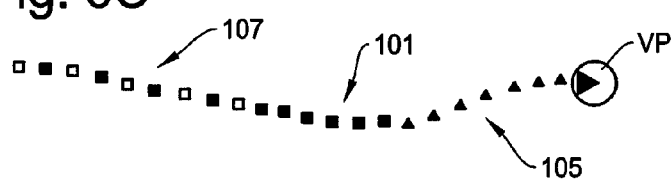

FIG. 6C is an example of thinning out method in the present invention where the oldest part of the data 101 is thinned out. In this example, a part of the off-road data is deleted in such a way that the trail data on the points of every 100 meters (standard data resolution) is changed to the data on the points of every 200 meters (every other point). By lowering the data resolution in this manner, it is possible to make a room in the memory, thereby enabling to store the new data 105 in the data storage 59.

Figure 6D:
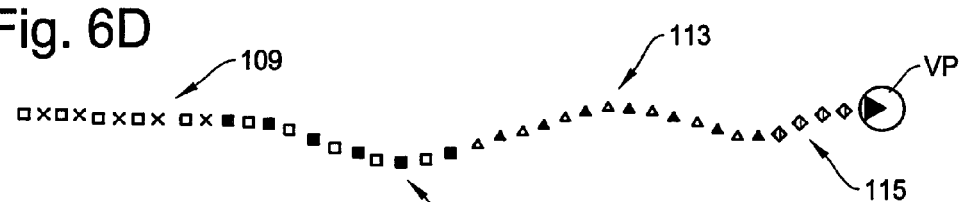
Figure 6E:
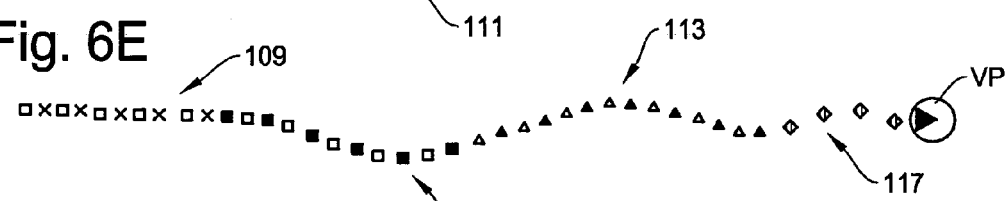

FIGS. 6D–6E show examples in which the method of FIG. 6C (deleting every other oldest data to make room for the newest data) had already thinned out the entire length of the trail recorded in the background (i.e., the entire trail was at the 50% resolution), and therefore the already thinned out oldest data points (indicated by numeral 109) are now being overwritten by the newest data on the oldest data 115. FIG. 6E shows the same condition as in FIG. 6D, except that the newest data 117 is recorded at the 50% resolution, which is a half-resolution of the method in FIG. 6B. The numeral 109 indicates the erased data, and data 111 and 113 indicate the thinned out data (ex. every 200 meters). In the example of FIG. 6D, the newest data 115 is stored in the off-road trail data storage 59 with the standard resolution. In the example of FIG. 6E, the newest data 117 is stored in the off-road trail data storage 59 with the reduced resolution.

Figure 6F:
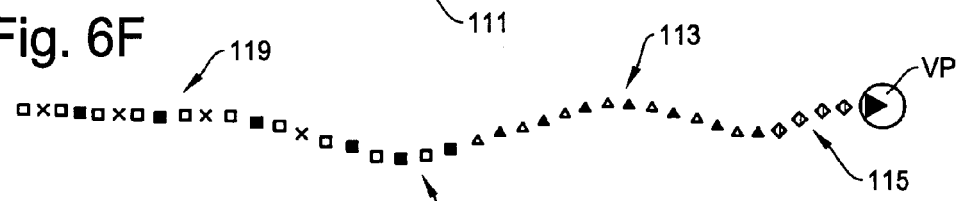
Figure 6G:
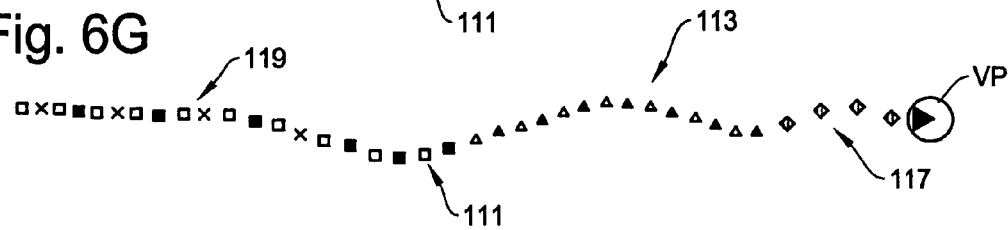

FIGS. 6F–6G show examples in which the thinning out process is further applied to the data storage. For example, the trail data of every 200 meters (initial reduced data resolution) is changed to the data of every 400 meters (deleting every other point the second time). Numeral 119 indicates further thinned out data (ex. every 400 meters), the data 111 and 113 are previously thinned out data (ex. every 200 meters). In the example of FIG. 6F, the newest data 115 is stored in the off-road trail data storage 59 with the standard resolution. In the example of FIG. 6G, the newest data 117 is stored in the off-road trail data storage 59 with the reduced resolution.

Figure 7:
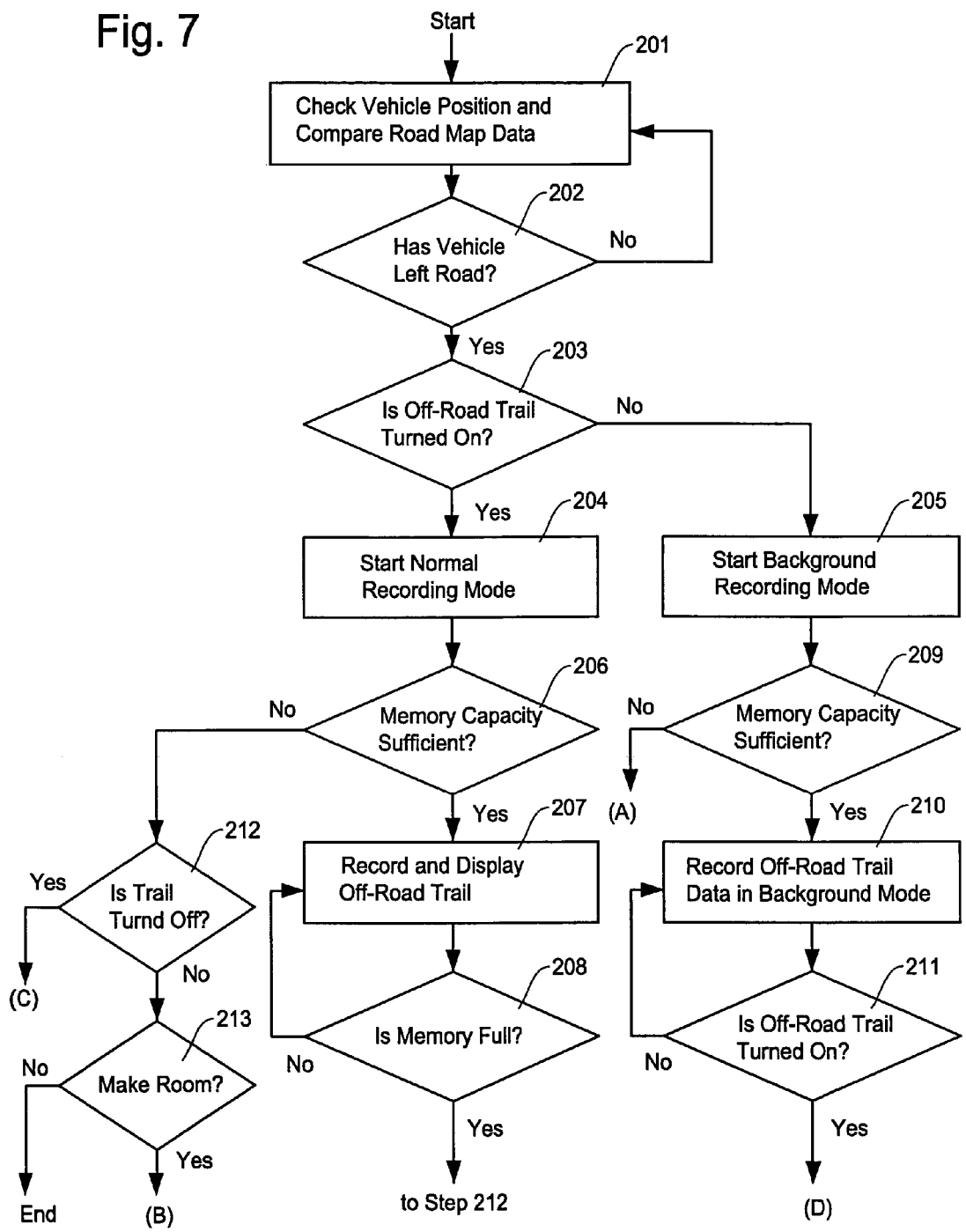
FIG. 7 is a flow chart showing an example of process of the off-road trail recording method in accordance with the present invention.
Figure 8:
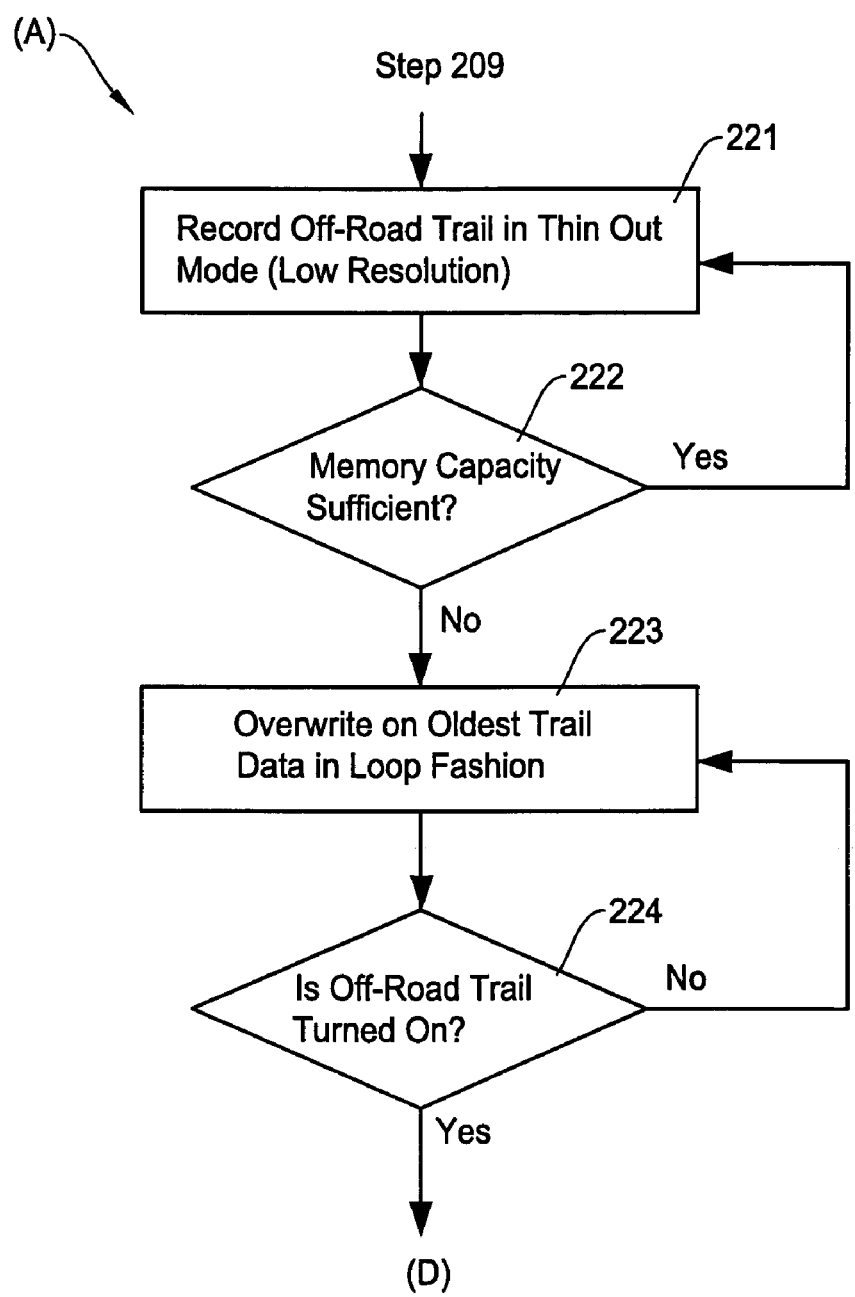
FIG. 8 is a flow chart showing an example of process of the off-road trail recording method corresponding to the routine (A) of FIG. 7.
Figure 9:
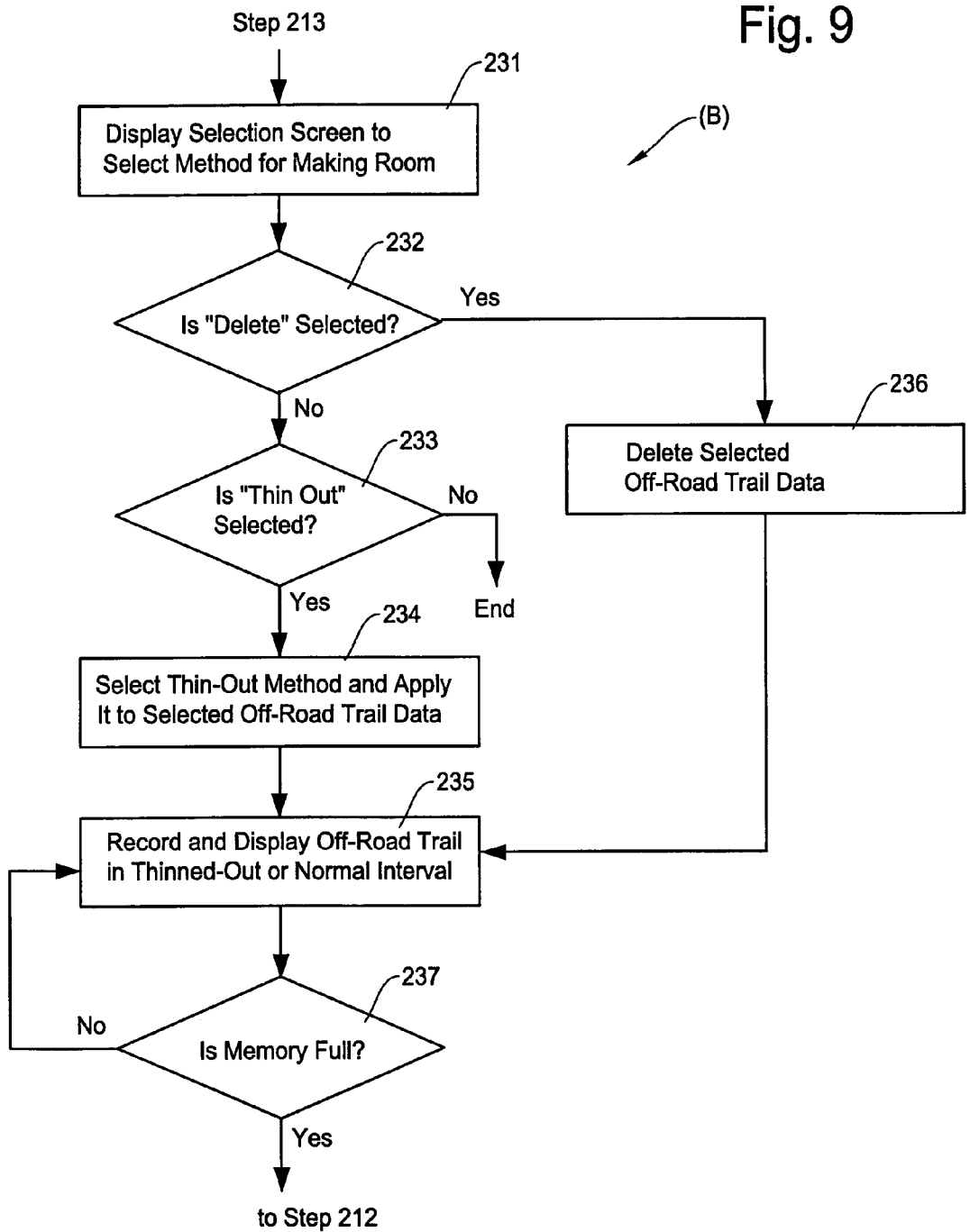
FIG. 9 is a flow chart showing an example of process of the off-road trail recording method corresponding to the routine (B) of FIG. 7.
Figure 10:
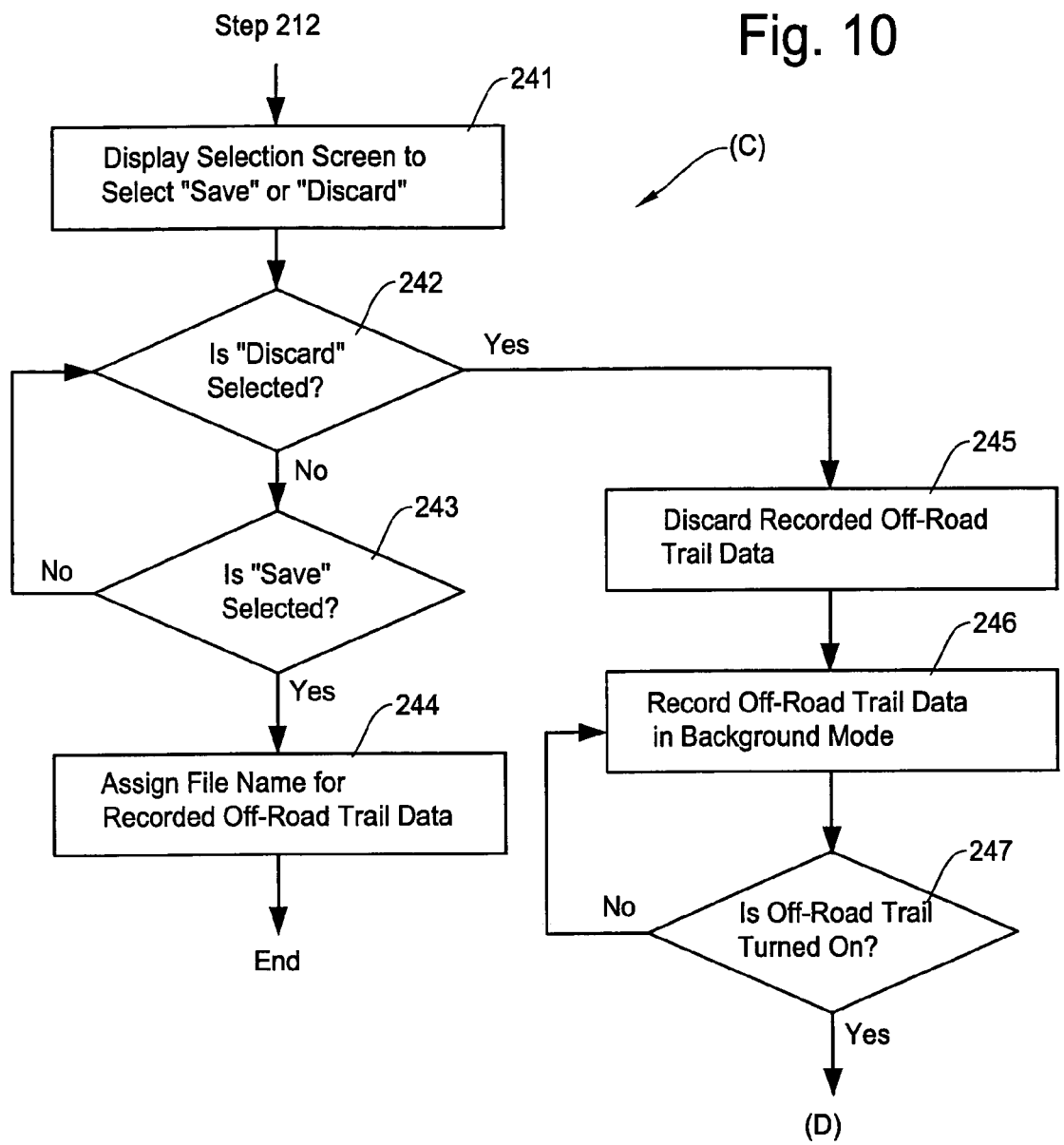
FIG. 10 is a flow chart showing an example of process of the off-road trail recording method corresponding to the routine (C) of FIG. 7.

Flow charts of FIGS. 7–11 illustrate operations involved in the off-road trail recording method in accordance with the present invention. FIG. 7 shows a basic operational process, FIG. 8 shows a process in the routine (A) of FIG. 7, FIG. 9 shows a process in the routine (B) of FIG. 7, FIG. 10 shows a process in the routine (C) of FIG. 7, and FIG. 11 shows a process in the routine (D) of FIG. 7. It should be noted that the operational flows shown in FIGS. 7–11 are simplified and do not necessarily completely match the processes and screen displays described with reference to FIGS. 3A–3O, FIGS. 4A–4P and FIGS. 5A–5P.

In FIG. 7, at step 201, the navigation system checks the vehicle position through the GPS system and compares the vehicle position with the road segments in the map data. Thus, in step 202, the navigation system determines whether the vehicle has left the road. If the vehicle is still on the road segments, the navigation system repeats the steps 201 and 202. In other words, the navigation system automatically detects whether the vehicle has entered the off-road area. If the vehicle has entered the off-road area, the navigation system starts the off-road trail recording in either the background or normal recording mode.

When the navigation system detects that the vehicle departs from the road segments, in step 203, it is determined whether the off-road trail recording is turned on by the user. If the off-road trail recording function is on, the navigation system starts the normal recording mode in step 204 (FIGS. 3H, 4F, 5F). If the off-road trail recording function is not on, the navigation system starts the background recording mode in step 205 (FIGS. 3D, 4D, 5D). In the normal recording mode, the navigation system records and displays the off-road trail in response to the vehicle travel. In the background recording mode, the navigation system records the off-road trail but does not display the recorded data on the screen.

In the normal recording mode, at step 206, it is determined whether the unused memory capacity in the off-road trail data storage is sufficient. If the memory capacity is sufficient, in response to the vehicle travel, the navigation system records the off-road trail data and displays the recorded data on the screen in step 207 (FIGS. 3F, 3H). If the memory capacity is insufficient or the memory space is no longer available, the navigation system moves to step 212 to check whether the user turns off the off-road trail recording function (FIG. 3I). During the normal recording mode of step 207, the navigation system checks the memory capacity at step 208. Unless the memory is full, the off-road trail recording is continued (FIG. 4F). If the memory becomes full, the process moves to the step 212 noted above.

In step 212, if it is detected that the user turns off the off-road trail recording function (FIG. 3J), the navigation system proceeds to the routine (C) which is shown in FIG. 10. If the off-road trail remains on, the navigation system asks whether the user wants to make room in the memory (FIGS. 4I, 4K). If the answer is no, the process ends. If the user indicates that the memory space be created, the navigation system moves to the routine (B) which is shown in FIG. 9.

In the background recording mode started at step 205, it is determined whether the unused memory capacity in the off-road trail data storage is sufficient at step 209. If the memory capacity is sufficient, in response to the vehicle travel, the navigation system records the off-road trail data in step 210 which is not displayed on the screen (FIGS. 3D, 4D, 5D). If the memory capacity is insufficient or the memory space is exhausted, the navigation system moves to the routine (A) which is shown in FIG. 8. During the background recording mode of step 210, the navigation system checks whether the off-road trail recording function (normal recording mode) is turned on at step 211 (FIGS. 3E, 4E, 5E). Unless the off-road trail recording is turned on, the background recording mode is continued. If the off-road trail recording is turned on, the process moves to the routine (D) which is shown in FIG. 11.

FIG. 8 is a flow chart showing an example of process in the routine (A) in FIG. 7. In the process of FIG. 7, when the memory capacity is insufficient in the background recording mode (step 209), the process of FIG. 8 starts. Since the memory capacity is insufficient, in response to the vehicle travel, the navigation system records the off-road trail by thinning out the data (lowering the data resolution) at step 221 (FIGS. 4D, 5D). As described in the foregoing, in the thin out mode, the number of data points is reduced, such as from every 100 meters to every 200 or 300 meters to reduce the data, thereby saving the memory capacity. Various other thin out methods are possible as described above with reference to FIGS. 2B and 6A–6G.

The remaining memory capacity of the off-road trail data storage is checked in step 222. As long as the memory capacity is sufficient for the recording in the thin out mode, the off-road trail recording with reduced resolution is continued in the background recording mode. If the remaining memory capacity is insufficient or there is no remaining memory capacity, at step 223, the navigation system overwrites the oldest off-road trail data recorded in the background mode with the newest off-road trail data as shown in FIGS. 6A–6G. In other words, in the background recording mode, the memory is used in a loop fashion.

Thus, in step 223, the navigation system records the off-road trail data which is not displayed on the screen. During the background recording mode, in step 224, the navigation system checks whether the off-road trail recording function (normal recording mode) is turned on. Unless the off-road trail recording is turned on, the background recording mode is continued. If the off-road trail recording is turned on, the process moves to the routine (D) shown in FIG. 11.

FIG. 9 is a flow chart showing an example of process in the routine (B) in FIG. 7. In the process of FIG. 7, when the memory capacity is insufficient in the normal recording mode, and the user wants to make a room in the memory for further recording at step 213, the process of FIG. 9 starts. Thus, at step 231, the navigation system displays a selection screen so that the user can select a file name of registered off-road trail data and a method for making a room in the memory (FIGS. 4K, 5K).

In this example, in addition to the list of file names, two methods for making a memory space, "Delete" and "Thin-Out" are displayed (FIGS. 4K, 5K). The user selects one of the file names and one of the methods of making the memory room. In the "Delete" method, the memory room is created by deleting one or more existing (registered) off-road trail data selected by the user. In the "Thin-Out" method, the memory room is created by reducing the number of points of the existing off-road trail data, i.e., lowering the resolution of the data selected by the user.

At step 232, the navigation system determines whether the user selects the method "Delete". If the method "Delete" is selected, the process moves to step 236 in which the user selects the name of the registered off-road trail data to be deleted. If the method "Delete" is not selected, the process moves to step 233 in which the navigation system determines whether the user selects the method "Thin-Out". If the method "Thin-Out" is not selected, the navigation system ends the off-road trail recording process since none of the methods are selected by the user.

When the method "Thin-Out" is selected in step 233, the navigation system prompts the user to select a method for thinning out the selected file (FIG. 5N). Such methods of thinning out the data are described with reference to FIG. 2B. The navigation system performs the process for thinning out the data of the selected off-road trail (lowering the data resolution) at step 234. Accordingly, a memory space has been created which enables navigation system to further record the off-road trail data (FIG. 5P).

In step 236, noted above, the navigation system deletes the selected off-road trail data. Accordingly, a memory space has been created which enables navigation system to further record the off-road trail data. In step 235, the navigation system records and displays the off-road trail in response to the vehicle travel in the off-road area (FIG. 5P). The navigation system checks the memory capacity in step 237, if the memory capacity is not full, the off-road trail recording in the normal mode is continued. If the memory becomes full, the process moves to step 212 in FIG. 7. Thus, if the user wants to make a room in the memory again, the process of FIG. 9 will be repeated.

FIG. 10 is a flow chart showing an example of process in the routine (C) of FIG. 7. In the process of FIG. 7, when the memory becomes full in the normal recording mode, and the user turns off the off-road trail recording at step 212, the process of FIG. 10 starts. Thus, at step 241, the navigation system displays a selection screen so that the user can select whether the off-road trail data recorded so far should be saved or discarded (FIG. 3J). Even though the memory has a sufficient remaining capacity, when the user turns off the off-road trail recording, the navigation system displays this selection screen.

Thus, the user selects one of the methods, "Save" or "Discard" for the current off-road trail data. At step 242, the navigation system determines whether the user selects the method "Discard". If the method "Discard" is not selected, the process moves to step 243 in which the navigation system further determines whether the method "Save" is selected. If the method "Save" is not selected, the process loops until one of the buttons is selected. If the method "Save" is selected, the navigation system prompts the user to assign a file name for the recorded off-road trail data at step 244 (FIG. 3K). After saving the trail data, the process ends. Because there is no memory space available, no off-road trail recording is performed in the background mode.

In step 242, when the user selects the method "Discard", the process moves to step 245 in which the currently recorded off-road trail data is deleted. In the present invention, even though the off-road trail recording function is turned off, when the vehicle further travels in the off-road area, such an off-road trail is recorded in the background mode. Thus, in step 246, since the memory has a space, the navigation system records the off-road trail data in the background recording mode (FIG. 3O).

During the background recording mode, in step 247, the navigation system checks whether the off-road trail recording function (normal recording mode) is turned on. Unless the off-road trail recording is turned on, the background recording mode is continued. If the off-road trail recording is turned on, the process moves to the routine (D) shown in FIG. 11.

FIG. 11 is a flow chart showing an example of process in the routine (D) of FIG. 7. In the process of FIG. 7, when the user turns on the off-road trail recording at step 211 (step 224 of FIG. 8, and step 247 of FIG. 10) where the off-road trail has been recorded in the background mode, the process of FIG. 11 starts. Thus, at step 251, the navigation system displays a selection screen so that the user can select whether the off-road trail data recorded in the background should be recovered or discarded (FIGS. 3E, 4E and 5E).

For example, the navigation system displays selection method "Road" and "Here". In the method "Road", the off-road trail data from the last road from which the vehicle left to the current vehicle position recorded in the background recording mode will be recovered in the normal recording mode. In the method "Here", the off-road trail recording and display will start from the current vehicle position. In other words, when the method "Here" is selected, the off-road trail data recorded in the background recording mode will be discarded.

Thus, the user selects one of the methods, "Road" or "Here" for the current off-road trail data. At step 252, the navigation system determines whether the user selects the method "Here". If the method "Here" is not selected, the process moves to step 253 in which the navigation system further determines whether the method "Road" is selected. If the method "Road" is not selected, the process loops until one of the buttons is selected. If the cancel key is pressed, the system resumes the background recording. If the method "Road" is selected, at step 254, the navigation system recovers the off-road trail data recorded in the background recording mode. The recovered data shows an off-road trail between the last road and the current vehicle position VP (FIGS. 3F, 4J, 5G)).

In step 252, when the user selects the method "Here", the process moves to step 255 in which the off-road trail data currently recorded in the background mode is deleted. Since the user selects that the off-road trail be displayed from the current position (not from the road), in step 256, the navigation system records and displays the off-road trail starting from the current vehicle position (FIG. 3G). When the off-road trail data from the road is recovered in step 254, the navigation system records and displays the off-road trail starting from the road in step 256 (FIG. 3I). The navigation system checks the memory capacity in step 257, and if the memory capacity is not full, the off-road trail recording in the normal mode is continued, and if the memory becomes full, the process moves to step 212 in FIG. 7. Thus, if the user wants to make a room in the memory again, the process of FIG. 9 will be repeated.

FIGS. 12A–12K are diagrams showing an example of trail recording operation for storing trail point data (trail samples) in the trail data storage 59 (FIG. 2B). This example shows the memory areas, the associated trail point data in the memory areas, and the off-road trail shapes. In this scheme, the newer portions of the off-road trail have the higher resolution than that of the older portions. This method is advantageous if the user considers that it is relatively easy to find the way in the off-road area near the road left off.

In FIGS. 12A–12K, boxes show unregistered (unsaved) memory areas in the off-road trail data storage, a box with no character represents an unused memory area, characters A, B, C. . . . represent trail points of the off-road trail, characters in the memory areas of dotted hatching represent newly added trail point data, and an X mark under the memory area indicates that the trail point data will be deleted in the next timing for making a memory room. Further in this example, an arrow with a solid line indicates that the content (trail point data) in the memory area will be shifted to the memory area pointed by the arrow, and an arrow with a broken line indicates that the content in the memory area is unchanged. The solid dot represents an end of the road (street) segment, i.e., a start point of the off-road trail.

FIG. 12A shows trail point data A, B, C and D and the corresponding off-road shape where D is newly added data. The trail data storage has unused memory areas indicated by blank boxes. In FIG. 12B, when the vehicle comes to the trail point E, the new trail point data E is added to the unused memory area. In FIG. 12C, when the vehicle comes to the trail point F, the new trail point data F is added to the unused memory area. In this situation indicated by an arrow (1), the trail data storage becomes full with the trail data of standard resolution (at 100% resolution for 100% trail length).

Thus, for further storing the off-road trail data, the thin out (lower resolution) mode is used. Namely, in FIG. 12C, the trail point data A is deleted, and the data B–F are shifted in the manner shown in FIGS. 12C–12D. When the vehicle comes to the trail point G, the new trail point data G is added to the unused memory area created by the above data shifting. Thus, the first thinning pass begins as indicated by an arrow (2) with 50% resolution for older trail points but at 100% resolution for the newer trail points.

In FIG. 12D, the trail point data C is deleted, and the data D–G are shifted in the manner shown in FIGS. 12D–12E. When the vehicle comes to the trail point H, the new trail point data H is added to the unused memory area created by the above data shifting. Similarly, the trail point data E is deleted, and the data F–H are shifted in the manner shown in FIGS. 12E–12F, and the new trail point data I is added to the unused memory area. Similarly, the trail point data G is deleted, and the data H–I are shifted in the manner shown in FIGS. 12F–12G, and the new trail point data J is added to the unused memory area. Similarly, the trail point data I is deleted, and the data J are shifted in the manner shown in FIGS. 12G–12H, and the new trail point data K is added to the unused memory area.

The data K is deleted in FIG. 12H, and as shown in FIG. 12I, when the vehicle comes to the trail point L, the new trail point data L is added to the unused memory area. In this situation indicated by an arrow (3), the first thinning pass finishes with 50% resolution and 200% trail length. Since the memory is full, for further recording the off-road trail, the resolution must be further reduced by deleting old data and adding new data.

Thus, in FIG. 12J, a second thinning pass begins at 25% resolution for older trail points but at 50% resolution for the newer trail points. In FIG. 12I, the trail point data B is deleted, and the data D–L are shifted in the manner shown in FIGS. 12I–12J to a make room in the storage for the new data. When the vehicle comes to the trail point M, the new trail point data M is added to the unused memory area. Similarly, in FIG. 12J, the trail point data F is deleted, and the data H–M are shifted in the manner shown in FIGS. 12J–12K, and the new trail point data N is added to the unused memory area in FIG. 12K.

In this manner, by repeating the foregoing operations, the trail point data will be recorded with lower resolution until the unregistered memory is exhausted with the minimum possible resolution. After that, if the user wants to further record the off-road trail, one or more registered trails must be deleted from the trail data storage to make memory rooms. Such a process will be described later with reference to FIGS. 14A–14K.

FIGS. 13A–13K are diagrams showing another example of trail recording operation for storing trail point data (trail samples) in the trail data storage 59 (FIG. 2B). This example shows the memory areas, the associated trail point data in the memory areas, and the off-road trail shapes. In this scheme, the central portions of the off-road trail have the higher resolution than that of the older or newer portions. This method is advantageous if the user considers that it is relatively easy to (1) find the way in the off-road area near the road left off, and (2) recall the most recent portions of the trail. The same marks, characters, and abbreviations as those of FIGS. 12A–12K are used in this example.

FIG. 13A shows trail point data A, B, C and D and the corresponding off-road shape where D is newly added data. The trail data storage has unused memory areas indicated by blank boxes. In FIG. 13B, when the vehicle comes to the trail point E, the new trail point data E is added to the unused memory area. In FIG. 13C, when the vehicle comes to the trail point F, the new trail point data F is added to the unused memory area. In this situation indicated by an arrow (1), the trail data storage becomes full with the trail data of standard resolution (at 100% resolution for 100% trail length).

Thus, for further storing the off-road trail data, the thin out (lower resolution) mode is used. Namely, in FIG. 13C, the trail point data A is deleted, and the data B–F are shifted in the manner shown in FIGS. 13C–13D. When the vehicle comes to the trail point G (200% length from previous point F), the new trail point data G is added to the unused memory area created by the above data shifting. Thus, the first thinning pass begins as indicated by an arrow (2) with 50% resolution for older and newer trail points but at 100% resolution for the central trail points.

In FIG. 13D, the trail point data C is deleted, and the data D–G are shifted in the manner shown in FIGS. 13D–13E. When the vehicle comes to the trail point H (200% length from previous point G), the new trail point data H is added to the unused memory area created by the above data shifting. As seen from the trail shape of FIG. 13E, the center portions of the off-road trail has a higher resolution than that of the older and newer portions of the off-road trail. Similarly, the trail point data E is deleted, and the data F–H are shifted in the manner shown in FIGS. 13E–13F, and the new trail point data I (200% length from point H) is added to the unused memory area.

At this stage, as shown by an arrow (3), the first thinning pass finishes with 50% resolution and 200% trail length. Since the memory is full, for further recording the off-road trail, the resolution must be further reduced by deleting old data and adding new data. Thus, the second thinning pass begins as indicated by an arrow (4) with 25% resolution for older and newer trail points but at 50% resolution for the central trail points. Namely, in FIG. 13F, the trail point data B is deleted, and the data D, F–I are shifted in the manner shown in FIGS. 13F–13G. When the vehicle comes to the trail point J (400% length from previous point I), the new trail point data F is added to the unused memory area.

Similarly, in FIG. 13G, the trail point data F is deleted, and the data G–J are shifted in the manner shown in FIGS. 13G–13H. When the vehicle comes to the trail point K (400% length from previous point J), the new trail point data H is added to the unused memory area created by the above data shifting. As seen from the trail shape of FIGS. 13G and 13H, the center portions of the off-road trail has a higher resolution than that of the older and newer portions of the off-road trail. Similarly, the trail point data H is deleted, and the data I–K are shifted in the manner shown in FIGS. 13H–13I. At a trail point L (400% length from previous point K), the new trail point data L is added to the unused memory area.

Thus, at the situation of FIG. 13I indicated by an arrow (5), the second thinning pass finishes with 25% resolution for the 400% trail length. Since the memory is full, for further recording the off-road trail, the resolution must be further reduced by deleting old data and adding new data. However, as indicated by an arrow (6), in FIGS. 13J and 13K, since the minimum resolution is reached, the trail point data G (FIG. 13J) or trail point data I (FIG. 13K) will not be recorded in the trail data storage.

FIGS. 14A–14k are diagrams showing an example of trail recording operation for storing trail point data (trail samples) in the trail data storage 59 (FIG. 2B). This example shows the case where the preexisting trail data is thinned out (Trail 1) or deleted (Trail 2) for creating unused memory areas for storing new trail data. FIGS. 14A–14K show a Trail 1 memory area, a Trail 2 memory area, and a new trail memory area. The same marks, characters, and abbreviations as those of FIGS. 12A–12K and 13A–13K are used in this example.

FIG. 14A shows trail point data A–F of a registered Trail 1 in the Trail 1 memory area, trail point data H–K of a registered Trail 2 in the Trail 2 memory area. The navigation system is now recording the data for a new off-road trail in the new trail memory area. After storing the trail point data S in FIG. 14B, as indicated by an arrow (1), the new trail memory area for the current recording is exhausted.

Consequently, the user decides to thin out the trail data of Trail 1 (see display example in FIG. 5K). Thus, the trail point data A of Trail 1 is deleted and the data B–F are shifted as shown in FIGS. 14B–14C, which creates an unused memory area (blank box). The unused memory area is assigned to the new off-road trail. Thus, as shown in FIG. 14D, the new trail point data T is added to the unused memory area. Similarly, the trail point data C of Trail 1 is deleted and the data D–F are shifted as shown in FIGS. 14D–14E. Thus, as shown in FIG. 14F, the new trail point data U is added to the unused memory area. Similarly, the trail point data E of Trail 1 is deleted and the data F are shifted as shown in FIGS. 14F–14G. Thus, as shown in FIG. 14H, the new trail point data V is added to the unused memory area.

Consequently, at a point indicated by an arrow (2), the Trail 1 becomes completely thinned out at 50% resolution for the 100% trail length. In this example, the current recording (new trail) is always 100% resolution for 100% trail length. Since the trail data storage is full, the user decides to delete Trail 2 (see display example in FIG. 5K). As shown in FIG. 14H, the trail point data H–K are deleted, which creates unused memory area of FIG. 14I (blank boxes). The unused memory areas are assigned to the new trail, thus, as shown in FIGS. 14J–14K and indicated by an arrow (3), the current recording continues for the new off-road trail as long as the unused memory space is still available.

As has been described above, according to the present invention, the off-road trail recording is achieved by the navigation system without regard to on/off settings of the off-road trail recording function by the user. The navigation system automatically detects that the vehicle has left the road and entered an off-road area and starts recording the off-road trail in the background mode. When the user turns on the off-road trail recording function later, the navigation system prompts the user to decide whether the off-road trail recorded in the background should be recovered.

The off-road trail recording method and apparatus of the present invention provides various means for recording the off-road trail with reduced resolution when the memory capacity is exhausted or insufficient. Typically, a thin out method is used to record the off-road trail with lower resolution to save the memory in which off-road trail data is acquired with a larger interval of points on the trail. Further, the off-road trail recording method and apparatus of the present invention provides means for creating a memory space for recording the off-road trail when the memory capacity is insufficient.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. An off-road trail recording method for navigation system, comprising the following steps of:
   detecting whether a user or user's vehicle (hereafter "vehicle") has left a road and entered an off-road area where no road segments data are available;
   recording off-road trail data in a background recording mode without displaying the off-road trail in response to vehicle's travel in the off-road area when detecting that the vehicle has left the road;

prompting the user to select whether to recover or delete the off-road trail data recorded in the background recording mode indicating the off-road trail connecting the road left off and a current vehicle position when a normal recording mode is activated; and recording off-road trail data and displaying the off-road trail data on a screen of the navigation system in the normal recording mode in response to vehicle's travel in the off-road area;

wherein the background recording mode is activated automatically when detecting that the vehicle has left the road, and the normal recording mode is activated by the user by turning on an off-road trail recording function of the navigation system.

2. An off-road trail recording method as defined in claim 1, further comprising a step of displaying the off-road trail connecting the road left off and the current vehicle position on the navigation system when the user selects to recover the off-road trail data recorded in the background recording mode.

3. An off-road trail recording method as defined in claim 1, wherein said step of recording the off-road trail data in the background recording mode includes a step of storing the off-road trail data in an unused memory area of an off-road trail data storage continuously.

4. An off-road trail recording method as defined in claim 1, wherein said step of recording the off-road trail data in the background recording mode includes a step of recording the off-road trail data with resolution lower than standard resolution when a memory capacity of an off-road trail data storage is exhausted or insufficient.

5. An off-road trail recording method as defined in claim 4, wherein said step of recording the off-road trail data with lower resolution includes a step of thinning out the off-road trail data when storing the off-road trail data in the off-road trail data storage.

6. An off-road trail recording method as defined in claim 5, wherein said step of thinning out the off-road trail data includes a step of determining whether to thin out newest points of the off-road trail data or oldest points of the off-road trail data.

7. An off-road trail recording method as defined in claim 5, wherein said step of thinning out the off-road trail data includes a step of determining a method of thinning out the off-road trail data based on parameters including a distance of the off-road trail, a time of the off-road trail or a combination thereof.

8. An off-road trail recording method as defined in claim 5, wherein said step of thinning out the off-road trail data includes a step of determining a method of thinning out the off-road trail data based on parameters including straight or curvature of the off-road trail or surface roughness of the off-road trail.

9. An off-road trail recording method as defined in claim 1, wherein said step of recording and displaying the off-road trail data in the normal mode includes a step of recording the off-road trail data with resolution lower than standard resolution when a memory capacity of an off-road trail data storage is exhausted or insufficient.

10. An off-road trail recording method as defined in claim 9, wherein said step of recording the off-road trail data with lower resolution includes a step of thinning out the off-road trail data when storing the off-road trail data in the off-road trail data storage.

11. An off-road trail recording method as defined in claim 1, wherein said step of recording and displaying the off-road trail data in the normal mode includes a step of selecting whether to delete existing off-road trail data or thin out the existing off-road trail data when a memory capacity of an off-road trail data storage is exhausted or insufficient.

12. An off-road trail recording method as defined in claim 10, wherein said step of thinning out the off-road trail data includes a step of determining whether to thin out newest points of the off-road trail data or oldest points of the off-road trail data.

13. An off-road trail recording method as defined in claim 10, wherein said step of thinning out the off-road trail data includes a step of determining a method of thinning out the off-road trail data based on parameters including a distance of the off-road trail, a time of the off-road trail or a combination thereof.

14. An off-road trail recording method as defined in claim 10, wherein said step of thinning out the off-road trail data includes a step of determining a method of thinning out the off-road trail data based on parameters including straight or curvature of the off-road trail or surface roughness of the off-road trail.

15. An off-road trail recording apparatus for navigation system, comprising:

means for detecting whether a user or user's vehicle (hereafter "vehicle") has left a road and entered an off-road area where no road segments data are available;

means for recording off-road trail data in a background recording mode without displaying the off-road trail in response to vehicle's travel in the off-road area when detecting that the vehicle has left the road;

means for prompting the user to select whether to recover or delete the off-road trail data recorded in the background recording mode indicating the off-road trail connecting the road left off and a current vehicle position when a normal recording mode is activated; and means for recording off-road trail data and displaying the off-road trail data on a screen of the navigation system in the normal recording mode in response to vehicle's travel in the off-road area;

wherein the background recording mode is activated automatically when detecting that the vehicle has left the road, and the normal recording mode is activated by the user by turning on an off-road trail recording function of the navigation system.

16. An off-road trail recording apparatus as defined in claim 15, further comprising means for displaying the off-road trail connecting the road left off and the current vehicle position on the navigation system when the user selects to recover the off-road trail data recorded in the background recording mode.

17. An off-road trail recording apparatus as defined in claim 15, wherein said means for recording the off-road trail data in the background recording mode includes means for storing the off-road trail data in an unused memory area of an off-road trail data storage continuously.

18. An off-road trail recording apparatus as defined in claim 15, wherein said means for recording the off-road trail data in the background recording mode includes means for recording the off-road trail data with resolution lower than standard resolution when a memory capacity of an off-road trail data storage is exhausted or insufficient.

19. An off-road trail recording apparatus as defined in claim 18, wherein said means for recording the off-road trail data with lower resolution includes means for thinning out the off-road trail data when storing the off-road trail data in the off-road trail data storage.

20. An off-road trail recording apparatus as defined in claim 19, wherein said means for thinning out the off-road trail data includes means for determining whether to thin out newest points of the off-road trail data or oldest points of the off-road trail data.

21. An off-road trail recording apparatus as defined in claim 19, wherein said means for thinning out the off-road trail data includes means for determining a method of thinning out the off-road trail data based on parameters including a distance of the off-road trail, a time of the off-road trail or a combination thereof.

22. An off-road trail recording apparatus as defined in claim 19, wherein said means for thinning out the off-road trail data includes means for determining a method of thinning out the off-road trail data based on parameters including straight or curvature of the off-road trail or surface roughness of the off-road trail.

23. An off-road trail recording apparatus as defined in claim 15, wherein said means for recording and displaying the off-road trail data in the normal mode includes means for recording the off-road trail data with resolution lower than standard resolution when a memory capacity of an off-road trail data storage is exhausted or insufficient.

24. An off-road trail recording apparatus as defined in claim 23, wherein said means for recording the off-road trail data with lower resolution includes means for thinning out the off-road trail data when storing the off-road trail data in the off-road trail data storage.

25. An off-road trail recording apparatus as defined in claim 15, wherein said means for recording and displaying the off-road trail data in the normal mode includes means for selecting whether to delete existing off-road trail data or thin out the existing off-road trail data when a memory capacity of an off-road trail data storage is exhausted or insufficient.

26. An off-road trail recording apparatus as defined in claim 24, wherein said means for thinning out the off-road trail data includes means for determining whether to thin out newest points of the off-road trail data or oldest points of the off-road trail data.

27. An off-road trail recording apparatus as defined in claim 24, wherein said means for thinning out the off-road trail data includes means for determining a method of thinning out the off-road trail data based on parameters including a distance of the off-road trail, a time of the off-road trail or a combination thereof.

28. An off-road trail recording apparatus as defined in claim 24, wherein said means for thinning out the off-road trail data includes means for determining a method of thinning out the off-road trail data based on parameters including straight or curvature of the off-road trail or surface roughness of the off-road trail.

* * * * *